United States Patent [19]

Maeda et al.

[11] Patent Number: 5,572,323
[45] Date of Patent: Nov. 5, 1996

[54] INFINITESIMAL DISPLACEMENT MEASURING APPARATUS AND OPTICAL PICK-UP UNIT

[75] Inventors: Hideo Maeda; Hiroshi Akiyama, both of Yokohama, Japan

[73] Assignee: Ricoh Company, Ltd., Tokyo, Japan

[21] Appl. No.: 364,140

[22] Filed: Dec. 27, 1994

[30] Foreign Application Priority Data

Dec. 27, 1993 [JP] Japan .................................. 5-330593
Jan. 31, 1994 [JP] Japan .................................. 6-009820

[51] Int. Cl.$^6$ .................................................. G01B 9/02
[52] U.S. Cl. ........................ 356/356; 356/354; 356/358
[58] Field of Search .................................. 356/354, 356, 356/355, 358; 250/237 G, 237 R, 208.1, 208.2

[56] References Cited

U.S. PATENT DOCUMENTS 5,015,835  5/1991  Ohuchida et al. .................. 250/237 R

OTHER PUBLICATIONS

U.S. Application Ser. No. 08/191,321, filed Feb. 2, 1994.
U.S. Application Ser. No. 08/191,599, filed Feb. 4, 1994.

*Primary Examiner*—Samuel A. Turner
*Assistant Examiner*—Amanda Merlino
*Attorney, Agent, or Firm*—Cooper & Dunham LLP

[57] ABSTRACT

An infinitesimal displacement measuring apparatus applicable to an optical pick-up unit of an optical disk unit includes a light source for emitting a light beam, an optical system through which the light beam emitted from the light source travels to an article, a double grating unit on which the light beam reflected by the article is incident, the double grating unit having a first grating and a second grating, the first grating receiving the light beam and generating ±n-th order diffraction light beams, the second grating receiving the ±n-th order diffraction light beams from the first grating and generating ±m-th order diffraction light beams, a photo-detector for detecting an interference pattern formed by the ±m-th order diffraction light beams from the second grating of the double grating unit, and an operation circuit for carrying out an operation obtaining a displacement of the article in a direction parallel to an optical axis of the optical system based on the interference pattern detected by the photo-detector.

36 Claims, 17 Drawing Sheets

FIG. 4A
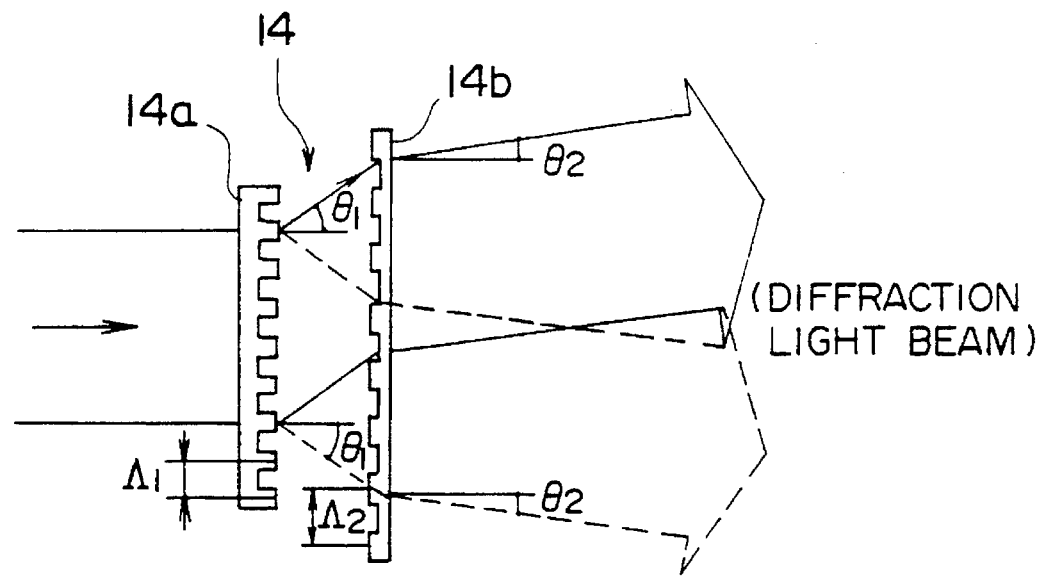
FIG. 4B
FIG. 4C
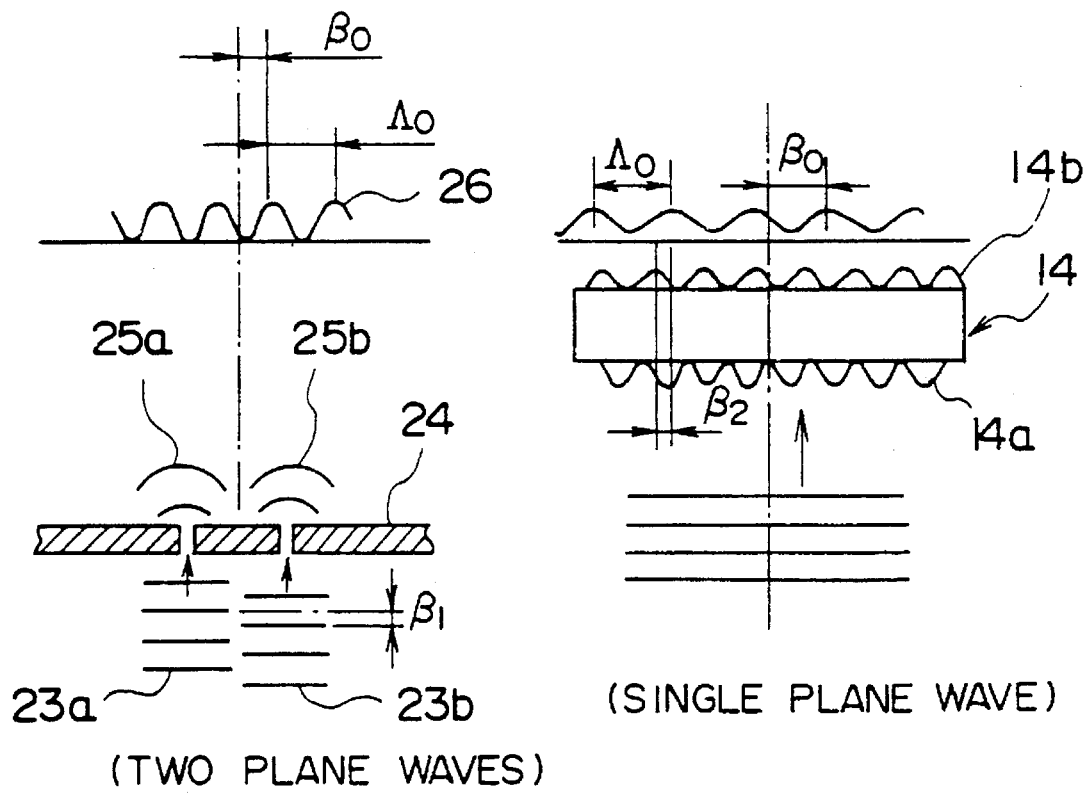
(TWO PLANE WAVES)
(SINGLE PLANE WAVE)

P WAVE  Q WAVE
(d = 0)

P WAVE  Q WAVE
(d < 0)

P WAVE  Q WAVE
(d > 0)

INFINITESIMAL DISPLACEMENT MEASURING APPARATUS AND OPTICAL PICK-UP UNIT

BACKGROUND OF THE INVENTION (1) Field of the Invention

The present invention generally relates to an infinitesimal displacement measuring apparatus and an optical pick-up unit, and more particularly to an infinitesimal displacement measuring apparatus for measuring an infinitesimal displacement of an article and an optical pick-up unit, used in an optical head of an optical disk system such as a magneto-optical disk system, to which the infinitesimal displacement measuring apparatus is applied.

(2) Description of the Related Art

Conventionally, an astigmatism method, a critical angle method and a knife-edge method have been known as methods applicable to a focus servo control system using focus error signals in an optical head of a magneto-optical disk unit. The astigmatism method is applied to not only the magneto-optical disk unit but also other optical disk units such as a compact-disk unit and a video-disk unit. Prior art regarding the astigmatism method is disclosed, for example, in Japanese Patent Publication No.53-39123, No.57-12188, No.60-48949 and No.61-61178.

FIG. 1 shows the principle of the astigmatism method applied to a conventional optical pick-up unit of a magneto-optical disk system.

Referring to FIG. 1, after a laser beam emitted from a semiconductor laser unit (not shown) is collimated by a collimate lens (not shown), the laser beam passes through a beam splitter 1 and is then focused on a surface of an optical disk 3 by an objective lens 2. Under a condition in which the laser beam is focused on the surface of the optical disk 3, a recording operation and a reproduction operation are carried out. A reflected beam from the optical disk 3 is turned back to the beam splitter 1 via the objective lens 2, and is reflected by the beam splitter 1. The beam reflected by the beam splitter 1 travels through a focusing lens 4 and a cylindrical lens 5, so that a beam 6 having the astigmatism is generated. This beam 6 is incident on a surface of a photo-detector 7. The surface of the photo-detector 7 is divided into four divisional detecting areas a, b, c and d. Signals output from the respective divisional detecting areas of the photo-detector 7 are supplied to an amplifier 8, so that focus error signal Fo, depending on a degree of defocusing of the laser beam on the surface of the optical disk 3, is output from the amplifier 8.

In a case where the laser beam is accurately focused on the surface of the optical disk 3, that is, in a case where the optical disk 3 is at a focused position, the beam 6 based on the laser beam reflected by the optical disk 3 is circularly shaped on the four divisional detecting areas a, b, c and d of the photo-detector 7. In this case, a differential output {(a+c)−(b+d)} from the amplifier 8 has a zero level, that is, the focus error signal Fo has the zero level (no focus error sinal is output).

On the other hand, in a case where the laser beam is defocused on the surface of the optical disk 3, that is, in a case where the optical disk 3 is at a position which is nearer to the objective lens 2 than the focused position or at a position which is further from the objective lens 2 than the focused position, the beam 6 is elliptically shaped on the surface of the photo-detector 7. In this case, the differential output from the amplifier 8 is not zero, that is, the defocusing signal Fo has a positive level (further from the objective lens 2) or a negative level (nearer to the objective lens 2). A position of the objective lens 2 is controlled based on the focus error signal Fo so that the laser beam is always accurately focused on the surface of the optical disk 3.

That is, in the above optical pick-up unit, the infinitesimal displacement of the optical disk 3 in a direction of an optical axis of the laser beam is measured, and the objective lens 2 is adjusted, based on the measurement result (the focus error signal Fo), so that the laser beam is always accurately focused on the surface of the optical disk 3.

In the recent years, this type of the optical disk unit is required to improve an access time for information. To comply with this request, the optical pick-up unit of the optical head must be miniaturized and lightened. However, in the above focus servo control system based on such the astigmatism method, since the variation of the spot shape of the laser beam has to be detected, a long optical path (e.g. a few centimeters) from the optical disk 3 to the photo-detector 7 is needed to obtain a sufficient detecting sensitivity. Thus, in the conventional optical disk unit, the miniaturization thereof is limited.

In addition, since the diameter of the laser beam spot on the surface of the photo-detector 7 is very small (e.g. falling within a rage from a few micrometers to a few tens micrometers), it is difficult to adjust a position at which the beam is incident on the photo-detector 7. As a result, the differential output from the amplifier 8 may have an off-set level, so that focus error signals obtained from the differential output are unstable.

SUMMARY OF THE INVENTION

Accordingly, a general object of the present invention is to provide a novel and useful infinitesimal displacement measuring apparatus and an optical pick-up unit in which the disadvantages of the aforementioned prior art are eliminated.

A more specific object of the present invention is to provide an infinitesimal displacement measuring apparatus which can be miniaturized.

Another object of the present invention is to provide an infinitesimal displacement measuring apparatus in which an optical adjusting operation required to obtain an accurate measuring result is easy.

The above objects of the present invention are achieved by an infinitesimal displacement measuring apparatus comprising: a light source for emitting a light beam; an optical system through which the light beam emitted from the light source travels to an article; a double grating unit on which the light beam reflected by the article is incident, the double grating unit having a first grating and a second grating, the first grating receiving the light beam and generating ±n-th order diffraction light beams (n is an integer), the second grating receiving the ±n-th order diffraction light beams from the first grating and generating ±m-th order diffraction light beams (m is an integer); detecting means for detecting an interference pattern formed by the ±m-th order diffraction light beams from the second grating of the double grating unit; and operation means for carrying out an operation for obtaining a displacement of the article in a direction parallel to an optical axis of the optical system based on the interference pattern detected by the detecting means.

According to the present invention, since the displacement of the article is measured by using the interference pattern generated by the double grating unit which can be thinned, the infinitesimal displacement measuring apparatus applicable to an optical pick-up unit can be miniaturized.

In addition, even if the spot size of the light beam projected on the double grating unit is small, the interference pattern including information representing a displacement of the article can be generated. Thus, the adjusting operation of the optical system is easy.

Still another object of the present invention is to provide an optical pick-up, used in an optical disk system, to which the above infinitesimal displacement measuring apparatus is applied.

This object of the present invention is achieved by an optical pick-up unit for irradiating a light beam onto a surface of a recording medium in order to optically record information in the recording medium and/or in order to optically reproduce information from the recording medium, the optical pick-up unit comprising: a light source for emitting a light beam; an optical system through which the light beam emitted from the light source travels to the recording medium, the optical system having at least an optical element for focusing the light beam on the surface of the recording medium; a double grating unit on which the light beam reflected by the optical disk is incident, the double grating unit having a first grating and a second grating, the first grating receiving the light beam and generating ±n-th order diffraction light beams (n is an integer), the second grating receiving the ±n-th order diffraction light beams from the first grating and generating ±m-th order diffraction light beams (m is an integer); and detecting means for detecting an interference pattern formed by the ±m-th order diffraction light beams from the second grating of the double grating unit and for outputting a detecting signal corresponding to the interference pattern.

According to the present invention, since the interference pattern generated by the double grating unit varies in accordance with a degree of defocusing of the light beam on the surface of the recording medium, the degree of defocusing of the light beam on the surface of the recording medium can be detected based on the detecting signal output from the detecting means. In addition, since the double grating unit for generating the interference pattern is used, the optical pick-up unit can be miniaturized and the optical adjusting operation is easy.

BRIEF DESCRIPTION OF THE DRAWINGS

Other objects, features and advantages of the present invention will become apparent from the following detailed description when read in conjunction with the accompanying drawings in which:

FIG. 4A is a diagram illustrating the principle in which interference fringes are generated by using the double grating unit;

FIG. 4B is a diagram illustrating an intensity distribution of an interference pattern generated by two plane waves which have passed through slits;

FIG. 4C is a diagram illustrating an intensity distribution of an interference pattern generated by using a double grating unit to which a single plane wave is supplied;

DESCRIPTION OF THE PREFERRED EMBODIMENTS

A description will be given, with reference to FIGS. 2–10, of a first embodiment of the present invention.

Figure 1:
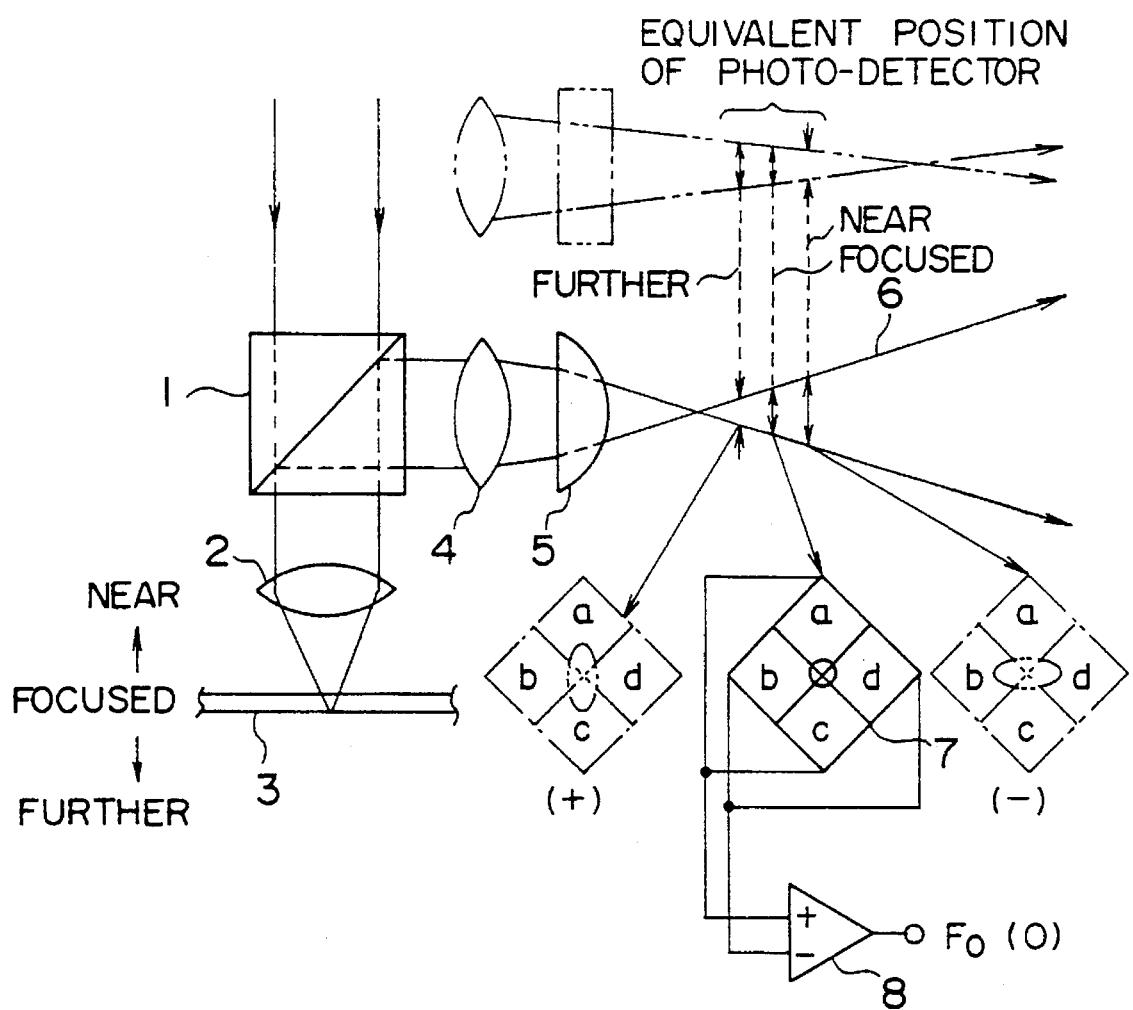
FIG. 1 is a diagram illustrating the operation principle of the astigmatism used system in a conventional optical pick-up unit of a magneto-optical disk system.
Figure 2:
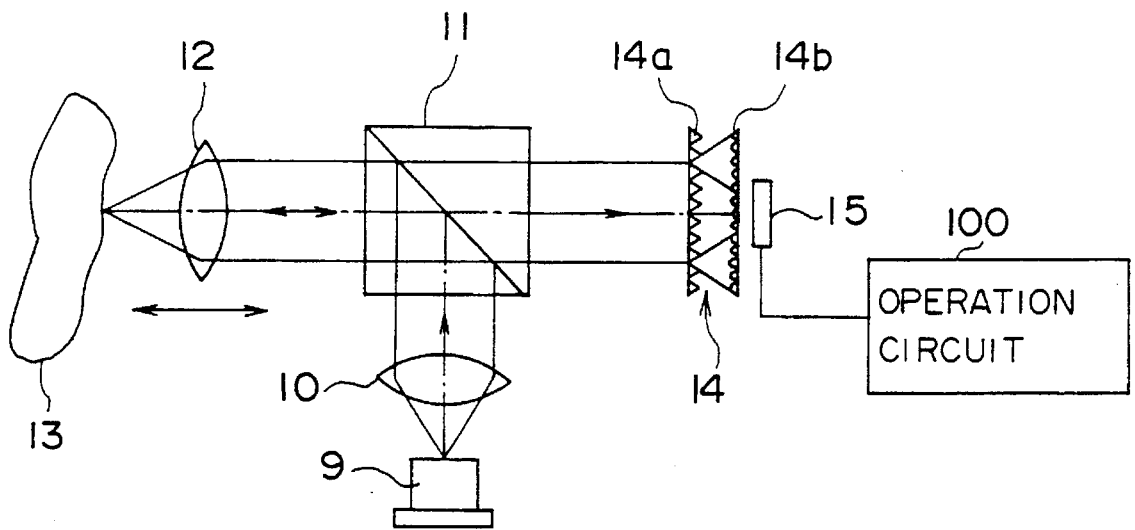
FIG. 2 is a diagram illustrating an essential configuration of an infinitesimal displacement measuring apparatus according to a first embodiment of the present invention.

FIG. 2 shows an infinitesimal displacement measuring apparatus having means for generating interference fringes. Referring to FIG. 2, a laser beam emitted from a semiconductor laser unit 9 (LD) is collimated by an collimate lens 10 and is then reflected by a beam splitter 11. The laser beam reflected by the beam splitter 11 travels to an objective lens 12 and is then focused on a surface of an article 13 by the objective lens 12. A reflected laser beam from the article 13 travels through the objective lens 12 again and passes through the beam splitter 11. The laser beam from the beam splitter 11 is incident on a double grating unit 14 having a function for generating interference fringes. The double grating unit 14 has a first grating 14a and a second grating 14b which face each other. The first grating 14a generates first diffraction light beams which are ±n-th order diffraction light. The second grating 14b generates second diffraction light beams which are ±m-th order diffraction light. The grating periods of the first grating 14a and the second grating 14b differ from each other. The interference fringes generated by the double grating unit 14 are projected onto a photo-detector 15 (e.g. a CCD). The photo-detector 15 outputs a detecting signal depending on the interference fringes projected thereon. The detecting signal is supplied to a operation circuit 100 (displacement calculation means). The operation circuit 100 calculates the phases and intervals of the interference fringes based on the detecting signal and calculates a displacement of the article 13 based on the phases and intervals of the interference fringes. The detailed method for calculating the displacement of the article will be described later.

The double grating unit 14 generates the interference fringes as follows.

Figure 3:
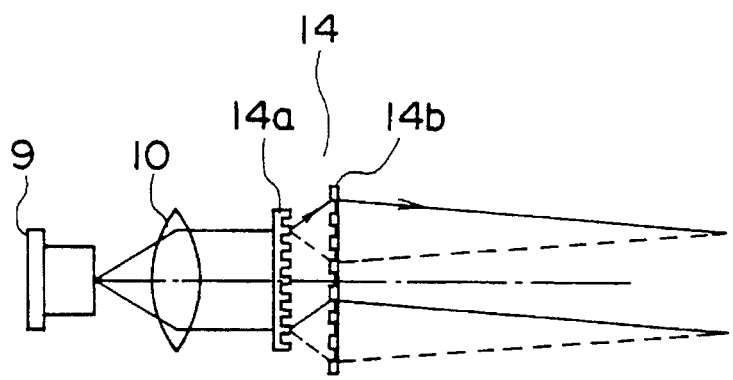
FIG. 3 is a diagram illustrating diffraction light generated by a double grating unit.

As shown in FIG. 3, in an optical path in which the laser beam emitted from the semiconductor laser unit 9 is collimated by the collimate lens 10, the double grating unit 14 is arranged so that the first grating 14a is positioned in a light source (the semiconductor laser unit 9) side and the second grating 14b is positioned in the opposite side. As shown in FIG. 4A, the grating period of the first grating 14a is $\Lambda_1$, the grating period of the second grating 14b is $\Lambda_2$, the diffraction angle on the first grating 14a is $\theta_1$ and the diffraction angle on the second grating 14b is $\theta_2$. Furthermore, for the sake of simplicity, it is assumed that the laser beam is perpendicularly incident on the first grating 14a.

The first grating 14a generates first diffraction light beams which are ±n-th order diffraction light (n is a positive integer). The second grating 14b generates second diffraction light beams. One of the second diffraction light beams is a −m-th order diffraction light based on the +n-th order diffraction light from the first grating 14a. Another one of the second diffraction light beams is a +m-th order diffraction light based on the −n-th order diffraction light from the first grating 14a. The second diffraction light beams, output from the second grating 14b, which are the ±m-th order diffraction light, are interfered, so that interference fringes are generated. The symbol (+) means that an incident light beam is diffracted in a left side direction to a direction in which the incident light beam travels. The symbol (−) means that an incident light beam is diffracted in a right side direction to a direction in which the incident light travels.

A diffraction condition under which the +n-th order diffraction light is generated by the first grating 14a is represented by the following formula (1).

$$\sin \theta_1 = n\lambda/\Lambda_1 \quad (1)$$

In a case of the −n-th order diffraction light, −n may be substituted for +n in the above formula (1).

A diffraction condition in the second grating 14b is represented by the following formula.

$$-\sin \theta_2 + \sin \theta_1 = m\lambda/\Lambda_2 \quad (2)$$

Based on the above formulas (1) and (2), the following formula (3) is obtained.

$$\sin \theta_2 = \lambda(n/\Lambda_1 - m/\Lambda_2) \quad (3)$$

As shown in FIG. 4B, two plane waves 23a and 23b, which are incident on a slit plate 24 at an angle $\theta_2$, pass through the slit plate 24, and waves 25a and 25b travels from the slit plate 24. A periodic interval $\Lambda_0$ of an intensity distribution 26 (interference fringes) in an interference pattern formed by interference of the waves 25a and 25b with each other is represented by the following formula (4).

$$\Lambda_0 = \lambda/(2 \sin \theta_2) \quad (4)$$

In addition, the phase $\beta_0$ of the interference fringes 26 is equal to the phase difference $\beta_1$ between the plane waves 23a and 23b. That is, $$\beta_0 = \beta_1 \quad (5)$$

stands.

Thus, a relationship between the periodic interval $\Lambda_0$ of the interference fringes and the grating periods $\Lambda_1$ and $\Lambda_2$ of the first and second gratings 14a and 14b of the double grating unit 14 is represented by the following formula (6).

$$1/(2\Lambda_0) = n/\Lambda_1 - m/\Lambda_2 \quad (6)$$

In addition, assuming that opposite signed (+ and −) order diffraction light beams are interfered, as shown in FIG. 4C, a phase relationship is inverted immediately behind the double grating unit 14. Thus, the phase $\beta_0$ of the interference fringes is represented by $$\beta_0 = 2\beta_2 \quad (7)$$

where $\beta_2$ is a phase difference between the first and second gratings 14a and 14b.

Figure 5:
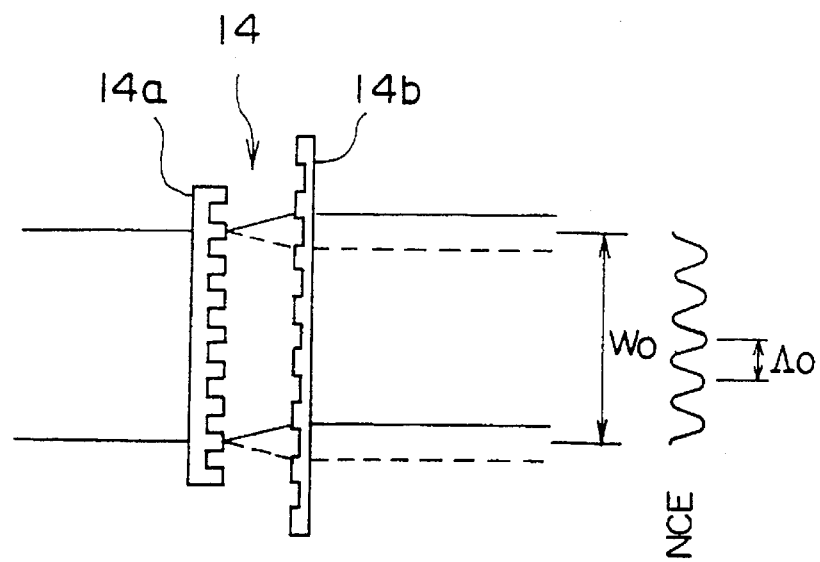
FIG. 5 is a diagram illustrating a spot size of a light beam which has passed through the double grating unit.

The above teaches that the periodic interval of the interference fringes depends on only the grating periods of the first and second gratings 14a and 14b of the double grating unit 14, regardless of the wave length of the incident light. The both sides of the formula (6) are multiplied by a value Wo of the diameter of the beam spot as shown in FIG. 5, so that the following formula (8) is obtained.

$$(Wo/\Lambda_0)/2 = nWo/\Lambda_1 - mWo/\Lambda_2 \quad (8)$$

In the above formula (8), $Wo/\Lambda_0$ is a number of fringes in the interference pattern generated in an area of the beam spot, and $Wo/\Lambda_1$ and $Wo/\Lambda_2$ are respectively numbers of diffraction grating lines of the first and second gratings 14a and 14b in the area of the beam spot. That is, the following relationship is obtained.

(NUMBER of INTERFERENCE FRINGES)/2=ORDER×(NUMBER of GRATING LINES of FIRST GRATING 14a)−ORDER×(NUMBER of GRATING LINES of SECOND GRATING 14b)  (9)

Figure 6:
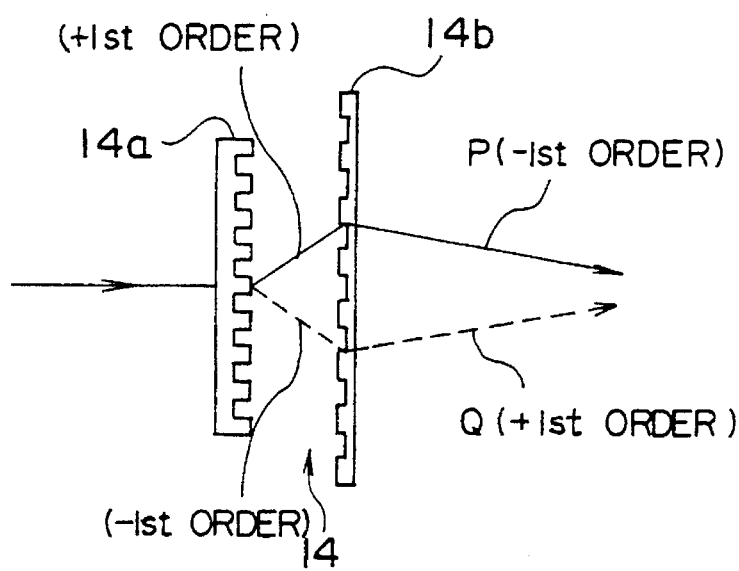
FIG. 6 is a diagram illustrating ±1st order diffraction light generated by the double grating unit.

Although the interference fringes can be obtained by using any order diffraction light beams, it is preferable, from the point of view of the efficiency of the diffraction, that the positive and negative primary (±1st order) diffraction light beams are used. For example, as shown in FIG. 6, a −1st order diffraction light beam P and a +1st order diffraction light beam Q are respectively generated by the second grating 14b based on a +1st order diffraction light beam and a −1st order diffraction light beam both of which are supplied from the first grating 14a. In this case, the diffraction light beams can be most efficiently generated by the double grating unit 14.

The number of interference fringes is estimated in a concrete case as follows.

In a case where only the ±1st order diffraction light beams are used and the grating period $\Lambda_1$ of the first grating 14a is equal to 0.94768 micrometers ($\Lambda_1$=0.94768 μm), the difference between the grating period $\Lambda_1$ of the first grating 14a and the grating period $\Lambda_2$ of the second grating 14b is very small, about a 3% difference, to obtain a large periodic interval $\Lambda_0$ (=1 mm) of the interference fringes. Such the first and second gratings 14a and 14b can be made by a present technique. Assuming that the diameter of the spot of collimated laser beam is about 2 millimeters, one or two interference fringes are generated.

A description will now be given, with reference to FIGS. 7–10, of how to measure an infinitesimal displacement of an article using the double grating unit 14 described above.

Figure 7:
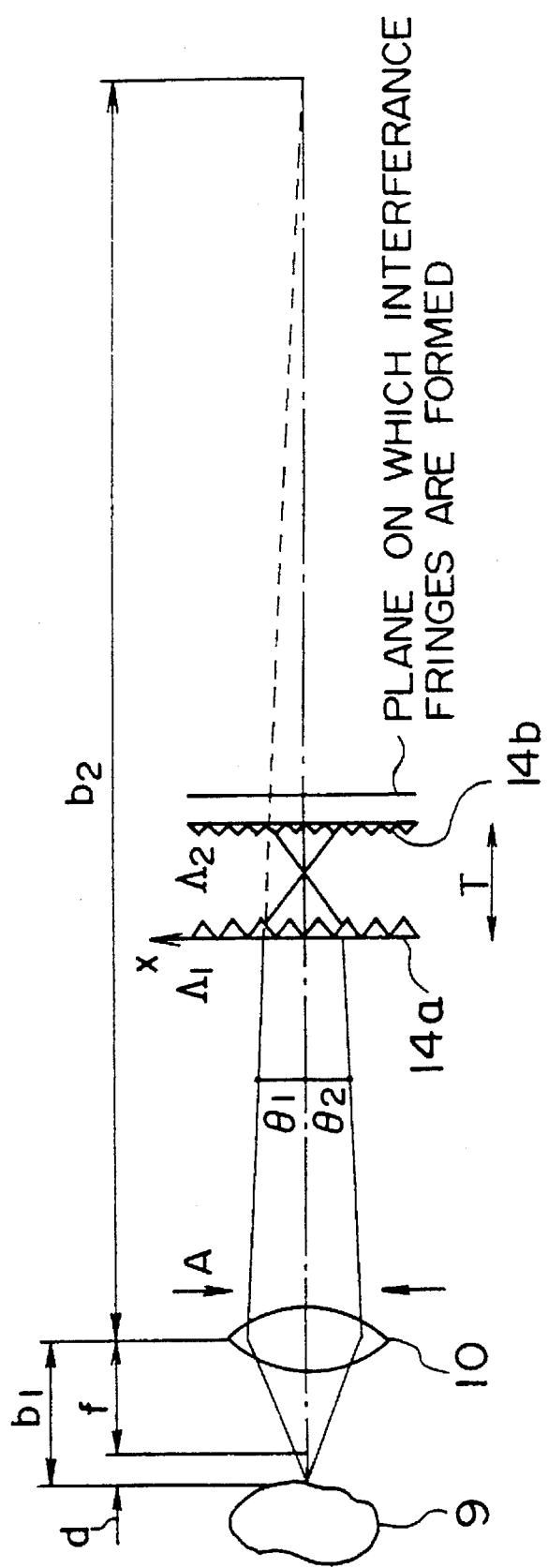
FIG. 7 is a diagram illustrating a method for measuring an infinitesimal displacement article by using the double grating unit.

Referring to FIG. 7, the objective lens 10 is arranged so that a light beam is substantially focused on the surface of an article 9, and the double grating unit 14 is arranged on an optical axis of the objective lens 10. A focal length of the objective lens 10 is represented by f, a distance between the objective lens 10 and the surface of the article 9 is represented by $b_1$, a distance between the objective lens 10 and a focused position on the double grating unit 14 side is represented by $b_2$ and an aperture of the objective lens 10 is represented by A. Furthermore, a difference between the focused position of the laser beam and the surface of the article 9 is represented by d, which difference is referred to as a defocusing, an angle at which a beam is incident on the double grating unit 14 is represented by θ and a distance between the first and second gratings 14a and 14b of the double grating unit 14 is represented by T. The angle θ is divided into $\theta_1$ which is a part in the upper side of the optical axis and $\theta_2$ which is a part in the lower side of the optical axis in FIG. 7. In this case, assuming that the focal length f is strongly greater than the defocusing d (d<<f), the following formulas (10), (11) and (12) stand.

$$1/f = 1/b_1 + 1/b_2 \quad (10)$$

$$\theta = A/b_2 \quad (11)$$

$$b_1 = f + d \quad (12)$$

Based on the formula (10), b2 is represented by the following formula (13).

$$b_2 = f \cdot b_1/(b_1 - f) \quad (13)$$

From the formulas (11) and (13), the following formula (14) is obtained.

$$\theta = A(b_1 - f)/f \cdot b_1 = A \cdot d/f \cdot (f+d) \approx A \cdot d/f^2 \quad (14)$$

Figure 8:
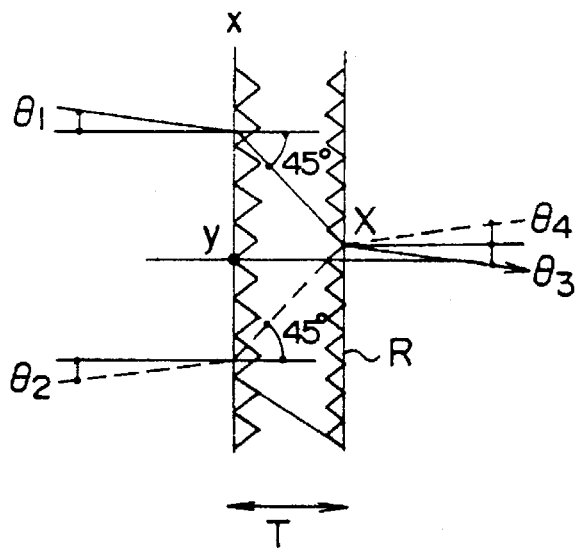
FIG. 8 is a diagram illustrating variation of a diffraction angle of diffraction light in the double grating unit.

In a case where the focal length f is strongly greater than the defocusing d (d<<f), the light beam from the objective lens 10 is nearly collimated, so that the objective lens 10 and the double grating unit 14 may be close to each other. If an X-axis is set, as shown in FIG. 8, on the surface of the double grating unit 14 (the origin (x=0) of the X-axis is on the optical axis), the aperture A of the objective lens 10 may correspond to an x coordinate on the X-axis (A=x). Thus, θ is represented by $$\theta = x \cdot d/f^2 \quad (15)$$

That is, the incident angle θ of the beam incident on the double grating unit 14 depends on a position (x) in a direction parallel to the surface of the double grating unit 14. When light beams from the both sides of the optical axis are diffracted twice by the double grating unit 14, the diffracted beams are crossed on a surface R through which the diffracted beams go out as shown in FIG. 8. Since the diffracted beams go out through the surface R at the different angles, the diffracted beams are interfered with each other, so that the interference fringes are formed on the surface R.

The intervals of the interference fringes at respective position are calculated as follows.

Figure 9:
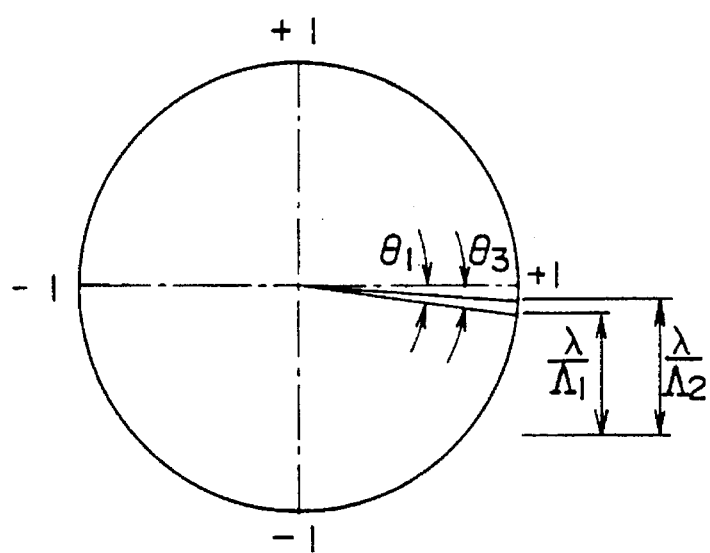
FIG. 9 is a diagram illustrating a diffraction diaphragm.

A first light beam from the upper side of the optical axis in FIG. 8 is incident on the surface of the double grating unit 14 at a position (x, y=0) at an incident angle $\theta_1$. In this case, the first light beam is diffracted by the double grating unit 14 twice and goes out through the surface R at an angle $\theta_3$. The angle $\theta_3$ is, with reference to FIG. 9, represented by the following formula (16).

$$\sin\theta_1 - \sin\theta_3 = \lambda(1/\Lambda_2 - 1/\Lambda_1) \quad (16)$$

Since the angles $\theta_1$ and $\theta_3$ are respectively nearly equal to zero ($\theta_1 \approx 0$ and $\theta_3 \approx 0$), the angle $\theta_3$ may be represented by the following formula (17).

$$\theta_3 = \theta_1 + \lambda(1/\Lambda_2 - 1/\Lambda_1) \quad (17)$$

In addition, θ represented by the formula (15) is substituted for θ1 in the formula (17), so that the following formula (18) is obtained.

$$\theta_3 = x \cdot d/f^2 + \lambda(1/\Lambda_1 - 1/\Lambda_2) \quad (18)$$

A position X at which the laser beam spot is located on the surface R specified by y=T is calculated as follows.

For the sake of simplicity, it is assumed that the diffraction angle of the first diffraction beam is 45°. In this case, the position X is calculated by $$X = x - T. \quad (19)$$

Now, x represented by the formula (19) is substituted for x in the formula (18), so that the following formula (20) is obtained.

$$\theta_3 = d \cdot (X+T)/f^2 + \lambda(1/\Lambda_1 - 1/\Lambda_2) \quad (20)$$

In addition, a second light beam from the lower side of the optical axis in FIG. 8 is incident on the surface of the double grating unit 14 at a position (x, y=0) at an incident angle $\theta_2$. In this case, the second light beam is diffracted by the double grating unit 14 twice and goes out through the surface R at an angle $\theta_4$. The angle $\theta_4$ is calculated in the same manner as the angle $\theta_3$ described above. Thus, the angle $\theta_4$ at which the second light beam goes out through the surface R is calculated in accordance with the following formula (22).

$$\theta_4 = d \cdot (X-T)/f^2 + \lambda(1/\Lambda_1 - 1/\Lambda_2) \quad (21)$$

In a case where incident angles of two light beams are respectively $\theta_3$ and $\theta_4$ which are nearly equal to zero ($\theta_3 \approx 0$ and $\theta_4 \approx 0$), the period interval $\Lambda_0$ of interference fringes generated by the interference of two light beams is calculated in accordance with the following formula (22).

$$\Lambda_0 = \lambda/(|\sin\theta_3 + \sin\theta_4|) = \lambda/(|\theta_3 + \theta_4|) \quad (22)$$

When $\theta_3$ represented by the formula (20) and $\theta_4$ represented by the formula (21) are substituted for those in the formula (22), the following formula (23) is obtained.

$$\Lambda_0(d) = \lambda/\{|2dT/f^2 + 2\lambda(1/\Lambda_1 - 1/\Lambda_2)|\} \quad (23)$$

The above formula (23) means that interference fringes arranged at the same intervals $\Lambda_0$ depending on the defocusing d regardless of the position X are formed. Now, assuming that $\Lambda_0(0)=\Lambda_0$ at d=0, where $\Lambda_0=\frac{1}{2}(1/\Lambda_1-1/\Lambda_2)$, the following formula (24) obtained as a fundamental formula describing the periodic interval of the interference fringes.

$$\Lambda_0(d,X) = \lambda/(|2dT/f^2 + \lambda/\Lambda_0|) \quad (24)$$
$$= 1/(|1/\Lambda_0 + 2(d/\lambda)T/f^2|)$$

Figure 10:
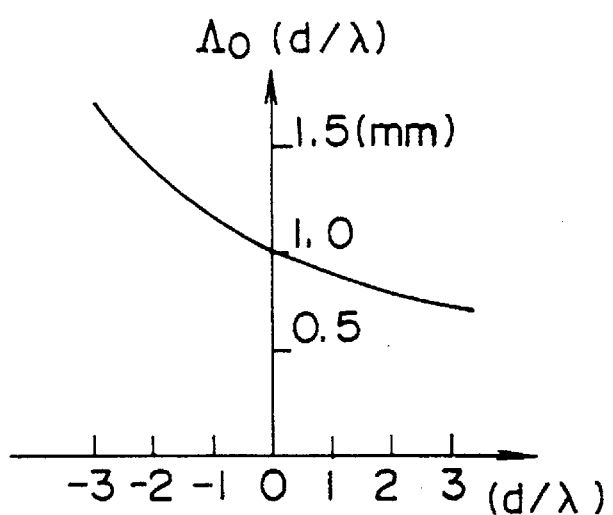
FIG. 10 is a graph illustrating variation of a periodic interval of the interference fringes.

For example, in a case where T=1 mm, f=4 mm and $\Lambda_0=1$ mm, a relationship between the periodic interval $\Lambda_0$ of the interference fringes and the infinitesimal displacement d of the article 9 is as shown in FIG. 10. Thus, the infinitesimal displacement d of the article 9 can be obtained from the periodic interval $\Lambda_0$ of the interference fringes, which is measured, in accordance with the relationship shown in FIG. 10. The phase of the interference fringes is represented by the above formula (7).

Thus, in the infinitesimal displacement measuring apparatus according to the above embodiment, the periodic interval of interference fringes formed by the double grating unit 14 is measured, and the infinitesimal displacement d of the article 9 can be calculated by using the measurement result (the periodic interval of the interference fringes).

As has been described above, the laser beam reflected by the article 9 is divided into two diffraction light beams by the double grating unit 14, and the two diffraction light beams are interfered, so that interference fringes are formed. The periodic interval and the phase of the interference fringes depend on a degree of the defocusing of the laser beam on the surface of the article 9. The defocusing of the laser beam corresponding to an infinitesimal displacement of the article 9 is calculated from the periodic interval and the phase of the interference fringes.

In addition, in the above embodiment, the grating periods of the first grating 14a and the second grating 14b differ from each other. Thus, even if the laser beam is accurately focused on the surface of the article 9, interference fringes are formed. As a result, the sign (+ and −) of the defocusing of the laser beam can be detected.

A description will now be given, with reference to FIGS. 11 and 12, of a second embodiment of the present invention. In the second embodiment, those parts which are the same as those described in the first embodiment are given the same reference numbers.

In the first embodiment described above, the grating periods of the first grating 14a and the second grating 14b of the double grating unit 14 differ from each other. On the other hand, in the second embodiment, the grating period of the first grating 14a is the same as that of the second grating 14b and there is a phase difference between the first grating 14a and the second grating 14b.

Since the grating periods of the first grating 14a and the second grating 14b are equal to each other, the interference fringes are not formed ($\Lambda_0\to\infty$) under a condition in which the laser beam is accurately focused on the surface of the article 9 (d=0). However, the interference fringes are formed under a condition in which the laser beam is defocused on the surface of the article 9 (the defocusing occurs). The condition of $\Lambda_0\to\infty$ is now applied to the above formula (24), so that the following formula (25) is obtained.

$$\Lambda_0(d)=f^2/\{|(d/\lambda)2T|\} \quad (25)$$

Figure 11A:
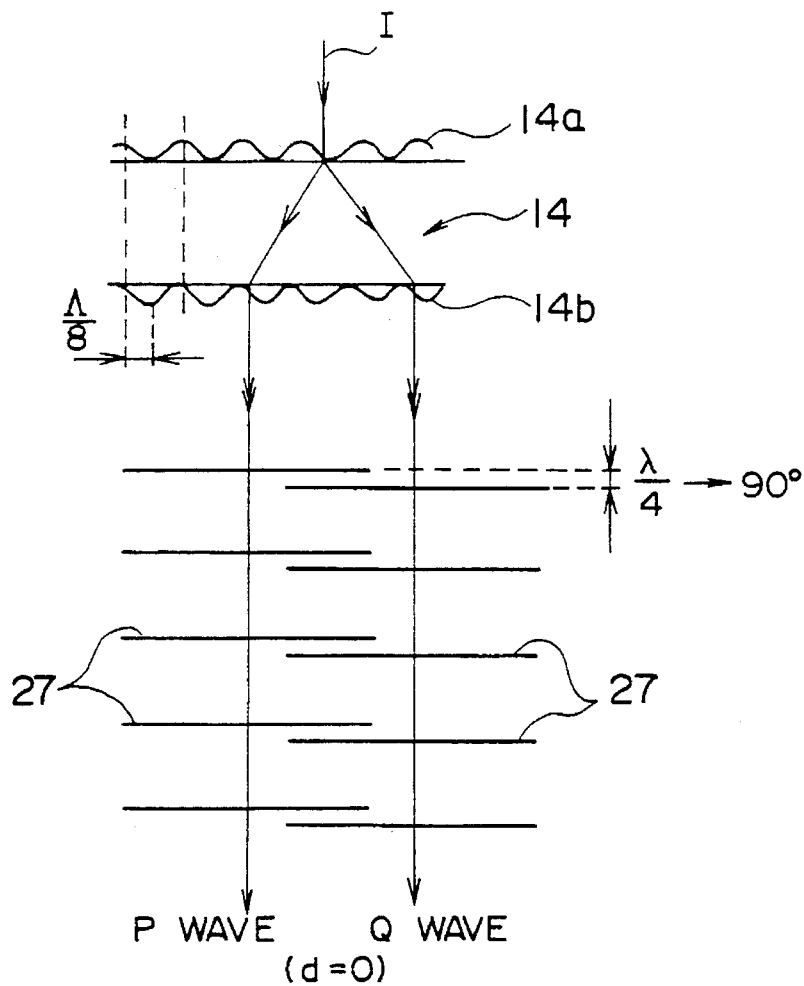
FIGS. 11A, 11B and 11C are diagrams illustrating states of wave fronts of waves radiated from the double grating unit.
Figures 11B, 11C:
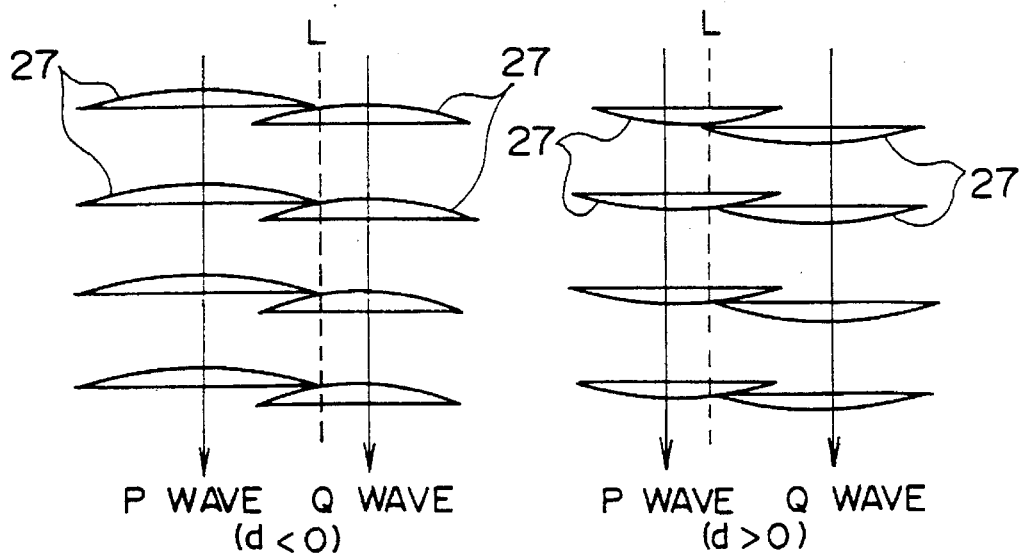

In this case, the phase of the first grating 14a and that of the second grating 14b differ from each other. FIGS. 11A, 11B and 11C show states where two light beams go out from the double grating unit 14 having the first grating 14a and the second grating 14b.

Referring to FIGS. 11A, 11B and 11C, ±1st order diffraction lights used to measure the defocusing of the laser beam I are respectively defined as a P wave and a Q wave. The grating periods of the first grating 14a and the second grating 14b are the same as each other, and the phase difference between the first grating 14a and the second grating 14b is 90° (one fourth wave length). In this state, when the defocusing does not occur (d=0), phase fronts 27 of the P wave and the Q wave are parallel to each other and alternately arranged like a comb, as shown in FIG. 11A. To make the phases of the first and second gratings 14a and 14b differ from each other by 90° (one fourth wave length), the first and second gratings 14a and 14b are arranged so that the phases thereof are shifted from each other by one eighth of the grating period.

When the defocusing occurs (d<0 and d>0), the phase fronts 27 of the P wave and the Q wave are microscopically curved as shown in FIGS. 11B and 11C. As a result, the phase fronts 27 of the P wave and the Q wave intersect each other, so that interference fringes arranged at a periodical interval calculated by the above formula (25) are formed. Positions at which the phase fronts 27 of the P wave and Q wave intersect each other are on the lines L shown in FIGS. 11B and 11C. That is, the positions at which the phase fronts 27 intersects each other in a case of the positive defocusing differ from the positions at which the phase fronts 27 intersects each other in a case of the negative defocusing. This means that the right and left phases are inverted in the above two cases.

Figure 12:
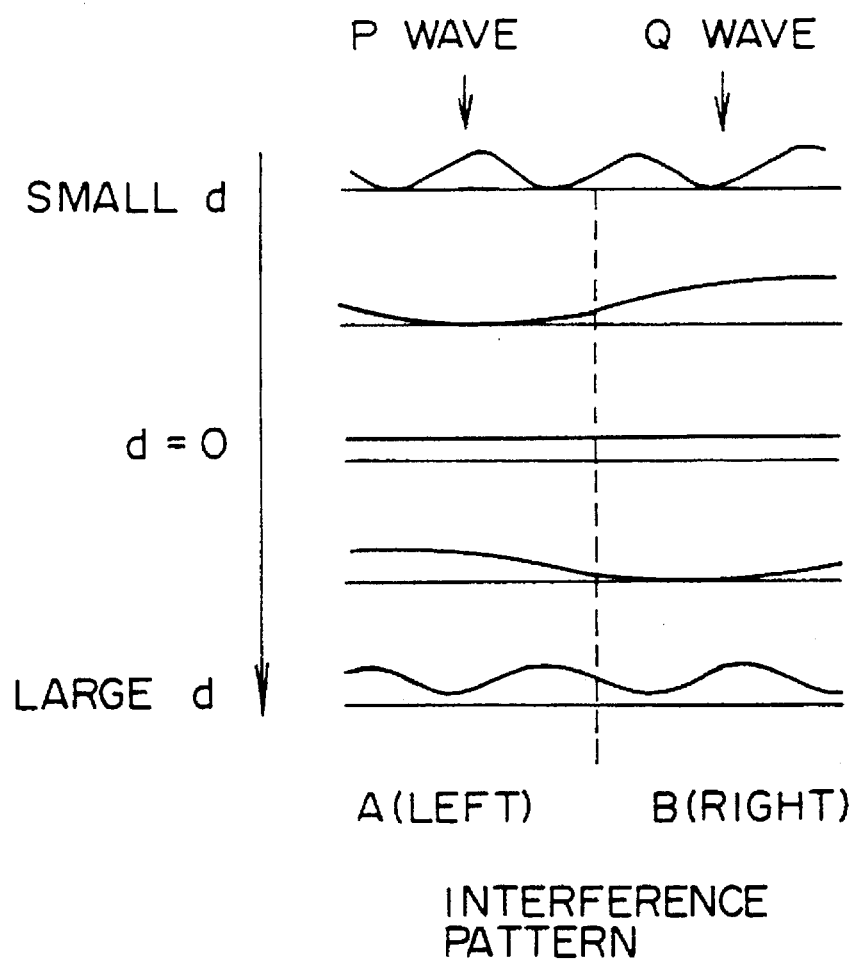
FIG. 12 is a diagram illustrating the light intensity distribution of interference patterns.

Qualitatively, light intensity distribution of the interference pattern is varied in accordance with the states of the defocusing, as shown in FIG. 12. In FIG. 12, the light intensity distributions of the interference pattern in cases where the defocusing d is negative (d) and positive (d) are inverted to each other. The variation of the light intensity distribution of the interference pattern is detected by the photo-detector 15, so that the defocusing d is detected.

Thus, the defocusing d of the laser beam can be detected by using the first grating 14a and the second grating 14b both of which has the same grating period and the phases differing from each other. Since the grating periods of the first and second gratings 14a and 14b are the same as each other, the grating unit 14 can be easily manufactured, so that the production cost of the grating unit 14 can be reduced.

A description will now be given, with reference to FIG. 13, of a logical analysis of the above embodiment.

Figure 13A:
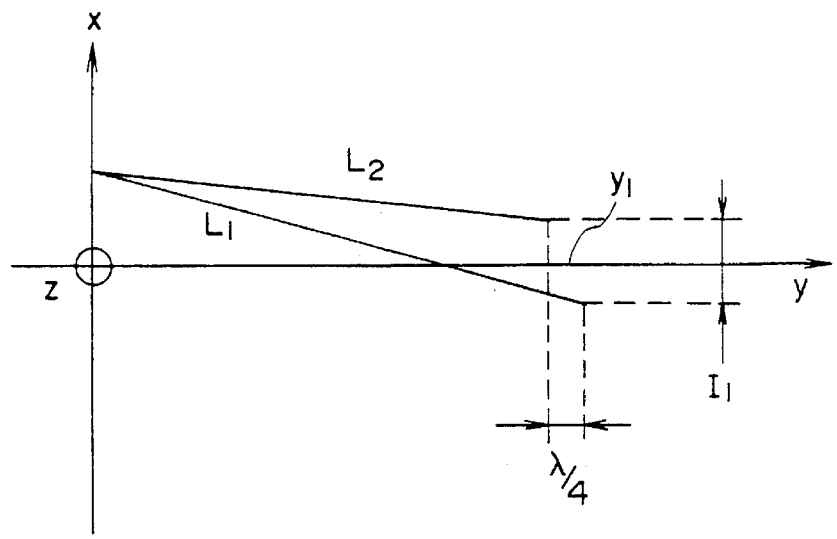
FIG. 13A is a diagram illustrating an equivalent optical system of a system between the double grating unit and the photo-detector.

FIG. 13A shows an equivalent optical system of the above embodiment. In the equivalent optical system shown in FIG. 13A, coordinate axes x, y and z having an origin O are set on a PD (photo-detector) surface. Distances between two light sources and the PD surface are respectively defined as $L_1$ and $L_2$, and a distance between the two light sources in an x-direction is defined as $l_1$. Coordinates (x, y) of a center between the light sources are defined as $(x_o, y_o)$. In this case, L1 and L2 are respectively represented by the following formulas (26) and (27).

$$L_1^2=(l_1/2+x)^2+y_o^2+z^2 \quad (26)$$

$$L_2^2=(-l_2/2+x)^2+y_o^2+z^2 \quad (27)$$

In a case where there is no phase difference between the first and second gratings of the DG (double grating unit), an optical path difference dL is represented by the following formula (28).

$$dL=L_1-L_2=(L_1^2-L_2^2)/(L_1+L_2)\approx[(l_1/2+x)^2-(-l_2/2+x)^2]/2y_o=l_1x/y_o \quad (28)$$

Thus, in a case where the phase difference between the first and second gratings is $\pi/2$, the phase difference $\delta$ between two light beams in the optical paths is represented by the following formula (29). This case is realized by shifting the grating periods of two gratings each other by ⅛ or ⅝ thereof.

$$\delta = 2\pi dL/\lambda + \pi/2 = 2\pi l_1 x/\lambda y_o + \pi/2 \qquad (29)$$

The intensity I of each of interference fringes generated by using two light sources is represented by the following formula (30).

$$I \propto \cos^2(\delta/2) \qquad (30)$$

when δ represented by the formula (29) is substituted for δ in the formula (30), the intensity distribution I(x) of the interference pattern is represented by the following formula (31).

$$I(x) \propto \cos^2(\pi l_1 x/\lambda y_o + \pi/4) = \{-\sin(2\pi l_1 x/\lambda y_o) + 1\}/2 \qquad (31)$$

When the defocusing d occurs on the optical disk, $y_o$ is calculated as follows.

The focal length of the objective lens is defined as $f_o$ and a focal point at which a light beam is focused by the objective lens in the detecting system side is defined as $y_1$. In this case, the following formula (32) is obtained.

$$1/(f_o+d) + 1/y_1 = 1/f_o \qquad (32)$$

Based on the formula, y1 is represented by the following formula (33).

$$y_1 \approx f_o^2/d \qquad (33)$$

When
$y_o = y_1 - y_2$,
the following formula (31) is obtained by substituting $y_1$ represented by the formula (33) for $y_1$ in the above formula (31), the following formula (34) is obtained.

$$I(x,d) \propto -\sin[2\pi l_1 x/\lambda(f_o^2/d - y_2)] + 1 \qquad (34)$$

The formula (34) is a fundamental formula describing the intensity distribution of the interference pattern.

In the fundamental formula, when $y_2$ is small, the intensity distribution is symmetric with respect to x and d. The intensity distribution symmetrically varies in accordance with the variation of the wave length. When the defocusing does not occur, the intensity distribution is even regardless of the wave length. That is, when the light beam is accurately focused on the optical disk, the wave length does not affect the intensity distribution.

When the intensity distribution I(x, d) is integrated in the x-direction, a S-shaped curve S(d) is obtained. The photo-detector (PD) has a first area falling in a range from x=−a to x=0 and a second area falling in a range from x=0 to x=a. Assuming that the intensity distribution I(x,d) is even, intensity distributions on the respective areas of the photo-detector are integrated, the difference between the integrated values is calculated. As a result, the following formula (35) is obtained. In this case, for the sake of simplicity, it is assumed that $y_2=0$.

$$S(d) \propto \lambda f_o^2[-1 + \cos(2\pi l_1 xd/\lambda f_o^2)]/\pi l_1 d \qquad (35)$$

FIG. 12B shows a focus error signal calculated in accordance with the above formula (35) (indicated by a dotted curve) and a focus error signal obtained in an experiment (indicated by a solid curve).

When the grating periods of the two gratings are shifted each other by a rate other than ⅛ and ⅝, the detecting sensitivity is lowered. In this case, however, the S-shaped curve characteristic of the detecting signal as shown in FIG. 12B can be obtained.

In the above embodiments, the photo-detector 15 is divided into two detecting areas A and B. Interference fringes generated by the second diffraction light beams which are the ±m-th order diffraction light are formed on the detecting areas A and B of th photo-detector 15. An infinitesimal displacement of the article 13 (9) is calculated based on the difference between outputs of the detecting areas A and B of the photo-detector.

In concrete, the detecting area A and B of the photo-detector 15 are respectively placed in the right optical path and the left optical path as shown in FIG. 12, and the variation of the intensity distribution in the interference pattern, that is, the difference (A−B) between the amounts of light incident to the detecting areas A and B is detected. As a result, the detecting signal as shown in FIG. 12B is obtained, and an infinitesimal displacement is calculated based on the detecting signal.

In the above embodiments, the ±n-th order diffraction light beams are generated by the first grating 14a and the ±m-th order diffraction light beams are generated by the second grating 14b. The order of the diffraction light is not limited to the above values. The interference fringes can be generated by using any order of diffraction light beams. It is preferable, from the point of view of diffraction efficiency, that the ±1st order diffraction light beams are used to generate the interference fringe. As a result, the measurement accuracy can improved.

A description will now be given, with reference to FIGS. 14–16, of a third embodiment of the present invention. In the third embodiment, those parts which are the same as those in the above embodiments are given the same reference numbers.

In the third embodiment, the measuring principle of the infinitesimal displacement measuring apparatus described in the above embodiments is applied to an optical pick-up unit of an optical head.

Figure 14:
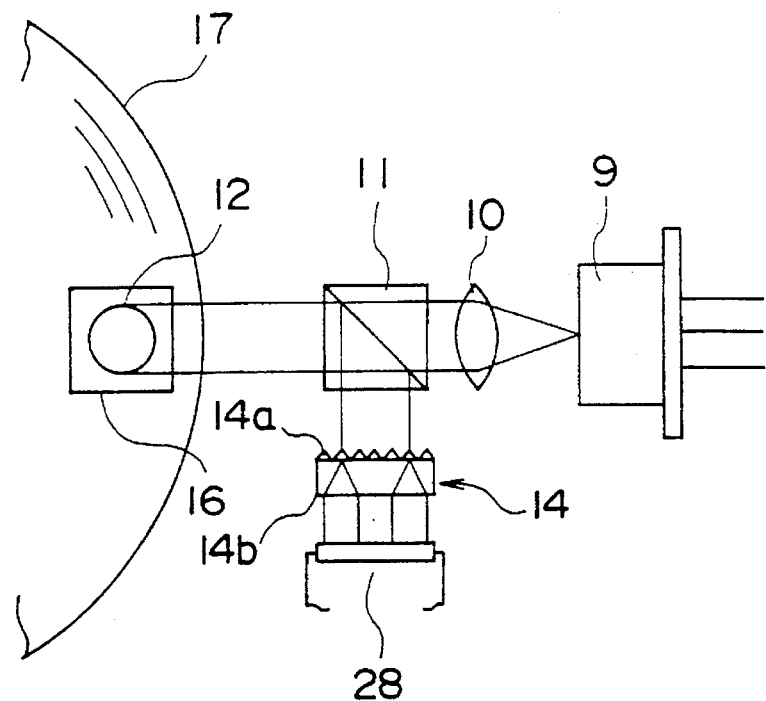
FIG. 14 is a diagram illustrating an optical pick-up unit to which the infinitesimal displacement measuring apparatus is applied.
Figure 15:
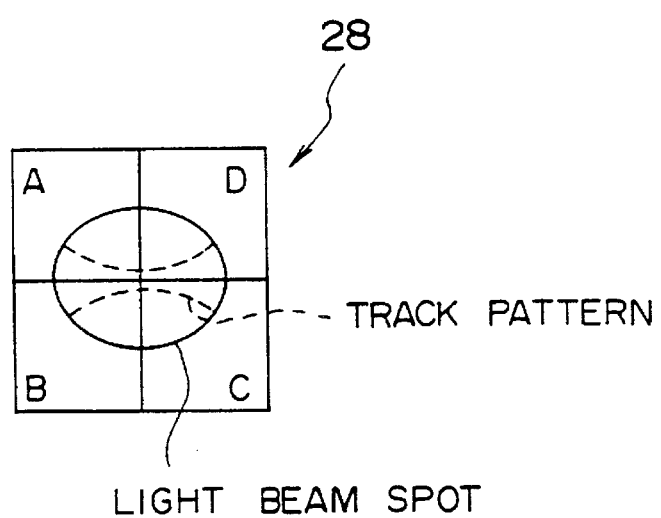
FIG. 15 is a diagram illustrating four detecting areas into which the surface of the photo-detector is divided.

Referring to FIG. 14 showing an optical pick-up unit, the double grating unit 14 is placed in an optical path through which a light beam reflected by an optical disk 17 and the beam splitter 11 travels. A photo-detector 28 having four detecting areas A, B, C and D into which the surface of the photo-detector 28 is divided is provided so that interference fringes generated by the double grating unit 14 are formed on the detecting areas A, B, C and D of the photo-detector 28. In this embodiment, a operation circuit unit (displacement calculation means: not shown) for generating a focus error signal Fe, a tracking error signal Te and a read/write signal based on detecting signals from the detecting areas A, B, C and D of the photo-detector 28 is provided.

In the optical pick-up having the structure described above, a light beam emitted from the semiconductor laser unit 9 travels to the beam splitter 11 via the collimate lens 10 and passes through the beam splitter 11. The light beam which has passed the beam splitter 11 is lead to and focused on the surface of the optical disk 17 by a mirror 16 and the objective lens 12. The light beam reflected by the optical disk 17 returns through the same optical path and is reflected by the beam splitter 11. The light beam reflected by the beam splitter 11 travels to the double grating unit 14. Two diffraction light beams are then generated by the double grating unit 14 and interference fringes are formed on the surface of the photo-detector 28, in accordance with the principle described above. The detecting signals from the photo-detector 28 vary in accordance with the periodic interval and the phase of the interference fringes formed on the photo-detector 28. The operation circuit (the displacement calculation means) calculates, based on the detecting signals from the photo-detector 28, a displacement of the optical disk 17 in a direction parallel to the optical axis. The focus error signal Fe and the tracking error signal Te are generated as information representing the displacement of the optical disk 17. The focus error signal Fe can be generated based on the intensity distribution of the interference pattern formed on the detecting areas A, B, C and D of the photo-detector 28. The tracking error signal Te can be generated based on interference fringes corresponding to a track pattern (see FIG. 15) on the optical disk 17. The focus error signal Fe and the tracking error signal Te are respectively generated in accordance with the following formulas (36) and (37).

$$Fe=(A+B)-(C+D) \quad (36)$$

$$Te=(A+D)-(B+C) \quad (37)$$

In the above formulas (36) and (37), A, B, C and D are detecting signals output from the detecting areas A, B, C and D of the photo-detector 28. In addition, the read/write signal can be obtained based on the total of the detecting signals from the detecting ares A, B, C and D of the photo-detector 28.

Although a CCD sensor may be used as the photo-detector 28, a photo diode may also be used as the photo-detector from the point of view of cost.

Figure 13B:
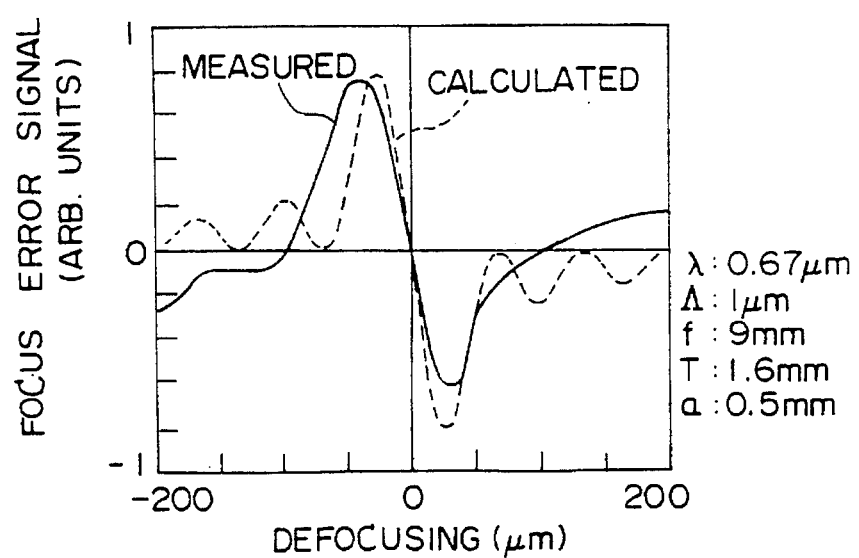
FIG. 13B is a graph illustrating relationships between the defocusing and the focus error signal output from the photo-detector.

FIG. 13 shows an example of a conventional optical pick-up unit. In this example, the semiconductor laser unit (LD) 9 and the photo-detector 21 are mounted in a capsule 20, and a hologram plate 22 having a grating function and the collimate lens 20 are in the outside of the capsule 20. The hologram plate 22 is placed between the semiconductor unit 9 and the collimate lens 10. In an art field of the optical disk, to miniaturize and thin the optical pick-up unit, it is important to shorten the focal length of the collimate lens 10 and to make the optical diameter of the collimate lens 10 small. However, in the conventional type of optical pick-up unit as shown in FIG. 15, since the hologram plate 22 is placed between the semiconductor laser unit 9 and the collimate lens 10, the collimate lens 10 having a short focal length can not be used. As a result, the conventional type of optical pick-up unit is not necessarily sufficiently miniaturized and lightened. On the other hand, in the optical pick-up unit according to the above embodiments, since the double grating unit 14 which can be thinned is used as a unit for generating interference fringes, the optical pick-up unit can be sufficiently miniaturized.

Figure 16:
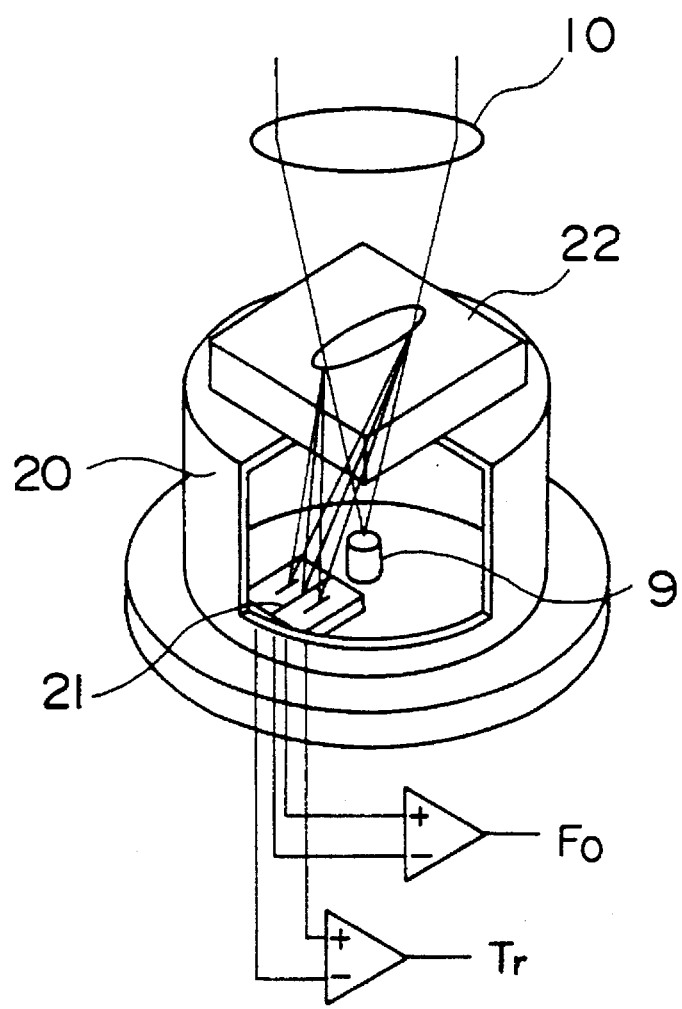
FIG. 16 is a diagram illustrating an example of a structure of a conventional optical pick-up unit.

In addition, in the conventional type of the optical pick-up unit, the dimensions of the beam spot on the photo-detector 21 shown in FIG. 16 is a few tens micrometers. On the other hand, in the optical pick-up unit according to the above embodiments, the dimensions of the beam spot on the photo-detector 28 is millimeters which are approximately equivalent to the dimensions of the collimated light beams spot. As a result, the adjusting operation of the optical system can be easily carried out. The adjusting operation of the optical system between the semiconductor laser unit 9 and the collimate lens 10 is carried out as follows.

A collimated light beam is reflected by a reference plane and is incident on the double grating unit 14. The grating direction of the first and second gratings 14a and 14b of the double grating unit 14 are then adjusted so as to be perpendicular to a direction in which tracks formed on the optical disk. The adjusting accuracy may be a few degrees. That is, the double grating unit 14 may be roughly adjusted. After this, the photo-detector 28 is brought close to the double grating unit 14, the position of the photo-detector 28 is adjusted with reference to the output signals from the photo-detector 28 with the adjusting accuracy of a few tens micrometers.

As has been described above, in the optical pick-up unit according to the above embodiment, the adjusting operation of the optical system can be more roughly carried out than that in the conventional case.

Furthermore, since the beam spot on the surface of the photo-detector is large, a superior circumstance resistance can be obtained. In addition, since the frame of the optical pick-up unit can be made of resin, the optical pick-up unit can be lightened. As a result, the accessing operation in the optical disk unit can be performed and the production cost can be decreased.

In the infinitesimal displacement measuring apparatus and the optical pick-up unit as has been described above, a degree of flatness of the wave surfaces of the waves generated by the double grating unit 14 is measured based on the interference fringes generated by the waves. Thus, in a case where the light beam incident to the objective lens 12 is a "completely plane wave", the focus error signal Fe has a zero level means that the light beam is focused on the surface of the optical disk. However, it is actually impossible to make the light beam be the "completely plane wave". In addition, there may be cases where the convergent light or the divergent light is intentionally used. In these cases, the focus error signal having the zero level does not means that the light beam is focused on the optical disk. That is, the focus error signal includes an off-set, so that the displacement of the optical disk is not accurately detected.

In the following embodiment, this disadvantage is eliminated.

FIG. 17 shows an infinitesimal displacement measuring apparatus (an optical pick-up unit) according to the fourth embodiment of the present invention. Referring to FIG. 17, light emitted from a semiconductor laser unit 101 is collimated by a collimate lens 102 so that a bundle A of rays are obtained. The bundle A of rays is then incident to a beam splitter 103. The bundle A of rays is divided into a bundle B of rays which pass through the beam splitter 103 and a bundle C of rays which are reflected by the beam splitter 103. The bundle B of rays is used as measurement light and the bundle C of rays is used as a monitoring light. The bundle B of rays is focused on the surface of an optical disk 105 (which is an article to be measured) by an objective lens 104. The bundle B of rays reflected by the optical disk 105 returns to the objective lens 104 and travels to the beam splitter 103. The bundle B of rays reflected by the beam splitter 103 is incident on the surface of a double grating unit 108. The double grating unit 108 has a first grating 108a for generating a first diffraction light beams B1 which are ±n-the order diffraction light and as second grating 108b for generating second diffraction light beams B2 which are ±m-the order diffraction light. That is, the first grating 108a on which the bundle B of rays reflected by the optical disk 105 is incident generates the first diffraction light beams B1 and the second grating 108b on which the first diffraction light beams B1 are incident generates the second diffraction light beams B2. The second diffraction light beams B2 are interfered so that interference fringes are generated. The interference fringes are formed on a two-divided photo-detector 109. An operation circuit (not shown) generates a differential signal F1 based on output signals from the two-divided photo-detector 109.

In addition, the bundle C of rays which are reflected by the beam splitter 103 before being incident to the objective lens 104 is incident, as monitor light, on a double grating unit 110. The double grating unit 110 has a first grating 110a for generating first diffraction light beams C1 which are ±n-the order diffraction light and a second grating 110b for generating second diffraction light beans C2 which are ±m-the order diffraction light. That is, the first grating 110a on which the bundle C of rays reflected by the beam splitter 103 is incident generates the first diffraction light beams C1 and the second grating 110b on which the first diffraction light beams C1 are incident generates the second diffraction light beams C2. The second diffraction light beams C2 are interfered with each other so that interference fringes are generated. The interference fringes are formed on a two-divided photo-detector 111. An operation circuit (not shown) generates a differential signal Fo, as a monitoring signal, based on the output signals from the two-divided photo-detector 111.

The double grating unit 108 and the two-divided photo-detector 109 operate as a measuring system and the double grating unit 110 and the two-divided photo-detector 111 operate as a monitoring system.

Figure 18:
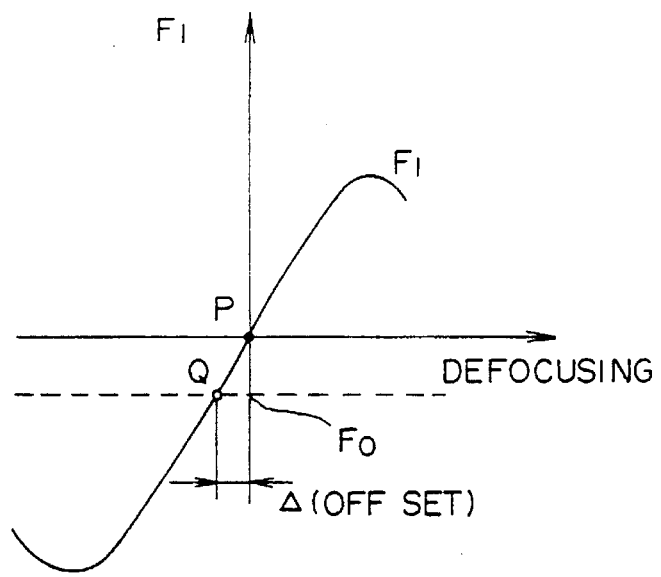
FIG. 18 is a graph illustrating a focus error signal having a S-shaped curve characteristic.

When the light beam is focused on the surface of the optical disk 5 by the objective lens 104, the bundle B of rays reflected by the surface of the optical disk 105 has, in principle, the same wave surface as the bundle C of rays which do not reach the objective lens 104. The differential signal F1 generated based on the output signals from the two-divided photo-detector 109 has an S-shaped curve characteristic as shown in FIG. 18. In the characteristic shown in FIG. 18, the differential signal F1 varies in the S-shaped curve in accordance with the defocusing of the light beam projected on the optical disk 105. The origin P of the S-shaped curve (at which the differential signal F1 is equal to zero (F1=0)) corresponds to a state where the bundle B of reflected rays has the completely plane surface. However, in this state, the light beam is not always focused on the surface of the optical disk 105. When a value of the S-shaped curve in a state where the light beam is focused on the surface of the optical disk 105 is indicated by Q, the difference between P and Q is an off-set Δ. The value of Q is approximately equal to the value of the differential signal Fo generated based on the output signals from the two-divided detector 111 in the monitoring system. Thus, due to the comparison of the differential signal F1 obtained in the measuring system with the differential signal Fo obtained in the monitoring system, the focus error signal Fe from which the off-set Δ is eliminated can be obtained.

In a concrete case, assuming that a summing signal of the output signals from the two-divided photo-detector 109 is represented by S1 and a summing signal of the output signals from the two-divided photo detector 111 is represented by So, the focus error signal Fe can be represented by the following formula (38).

$$Fe = (F1/S1) - (Fo/So) \quad (38)$$

In the above formula (38), (F1/S1) is a value in which the differential signal F1 is normalized by the summing signal S1 corresponding to a total amount of light incident on the two-divided photo-detector 109, and (Fo/So) is a value in which the differential signal Fo is normalized by the summing signal So corresponding to a total amount of light incident on the two-divided photo-detector 111 in the monitoring system.

Figure 19:
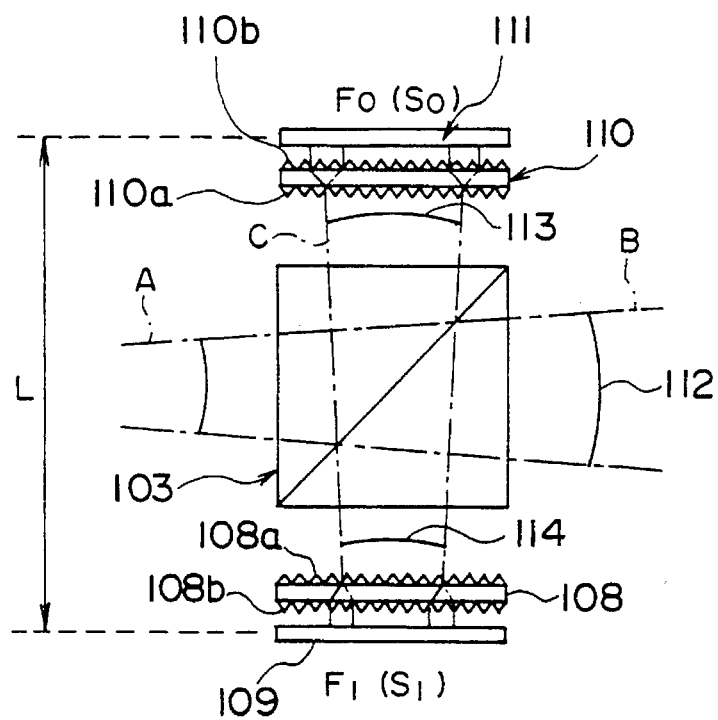
FIG. 19 is a diagram illustrating wave surfaces split from each other by a beam splitter.

As shown in FIG. 19, when the bundle B of rays has a wave surface 112 convexly curved toward the objective lens 104, the bundle C of rays incident on the surface of the double grating unit 110 in the monitoring system has a wave surface 113 convexly curved toward the double grating unit 110. In this case, if the light beam is focused on the surface of the optical disk 105, the bundle B of rays which are reflected by the beam splitter 103 and is incident on the surface of the double grating unit 108 in the measuring system has a wave surface 114 concavely curved toward the double grating unit 108. Thus, the polarity of the differential signal F1 obtained in the measuring system is opposite to the polarity of the differential signal Fo obtained in the monitoring system. In this case, the radius of curvature of the respective wave surfaces 113 and 114 exceeds a few tens meters, and the difference L between the two-divided photo-detectors 108 and 111 is about 100 millimeters (0.1 meters). Thus, the bundles B and C of rays have the wave surfaces 113 and 114 which are approximately parallel to each other and have almost the same radius of curvature. As a result, absolute values of the differential signals F1 and Fo respectively obtained in the measuring system and the monitoring system are substantially equal to each other.

As has been described above, in the above embodiment, the light beam A is divided into the bundle B of rays and the bundle C of rays by the beam splitter 103 and the wave surface 113 of the bundle C of rays which have passed though the double grating unit 110 is monitored. The wave surface 114 of the bundle B or rays which have passed through the double grating unit 108 is compared with the monitored wave surface 113 in accordance with the above formula (38). As a result, the focus error signal Fe from which the off-set Δ is eliminated can be obtained. Thus, even if the bundle B of rays is not completely plane wave, the focus error signal from which the off-set Δ is eliminated is obtained. The focus control of the objective lens 104 can be carried out by using the focus error signal Fe.

In addition, even if the distance between the semiconductor laser unit 101 and the collimate lens 102 is changed with passage of time and/or the state of the collimated light beam is changed in accordance with variation of the wave length of the light beam, the focus error signal Fe which should be obtained in a state where the light bean is focused on the surface of the optical disk 105 can be calculated using the monitoring result of the wave surface 113. Thus, the off-set based on the change of the dimensions of the optical system with passage of time and the temperature variation can be eliminated from the focus error signal Fe. As a result, the focus control in the optical pick-up unit can be carried out with a high reliability.

The focus control system applied to the optical pick-up unit as described above is, for example, formed as shown in FIG. 17B.

Figure 17A:
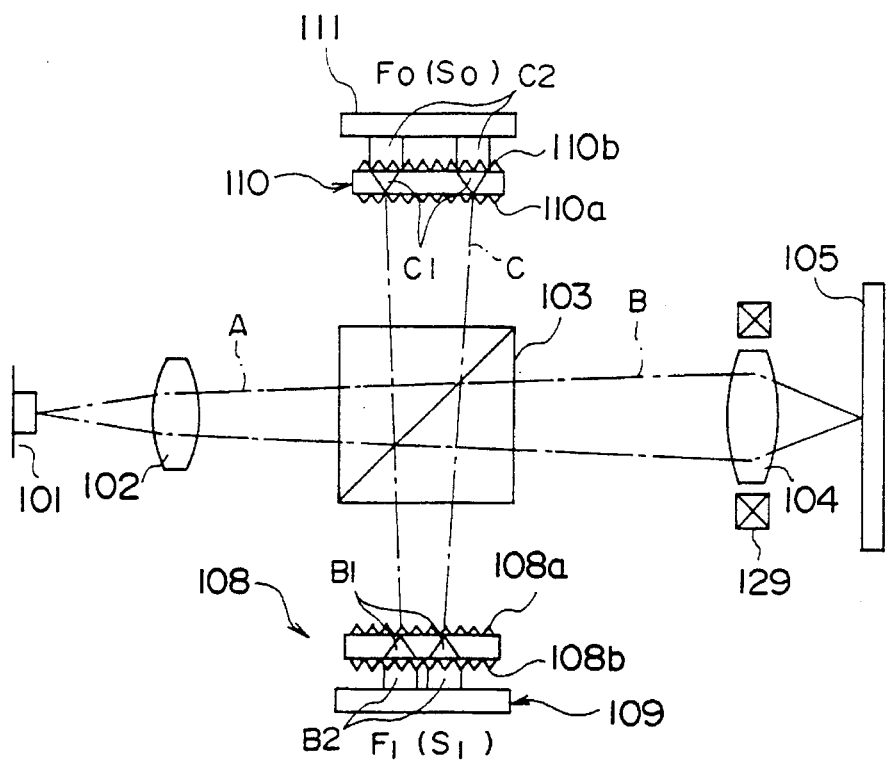
FIG. 17A is a diagram illustrating a configuration of the optical pick-up unit according to another embodiment of the present invention.
Figure 17B:
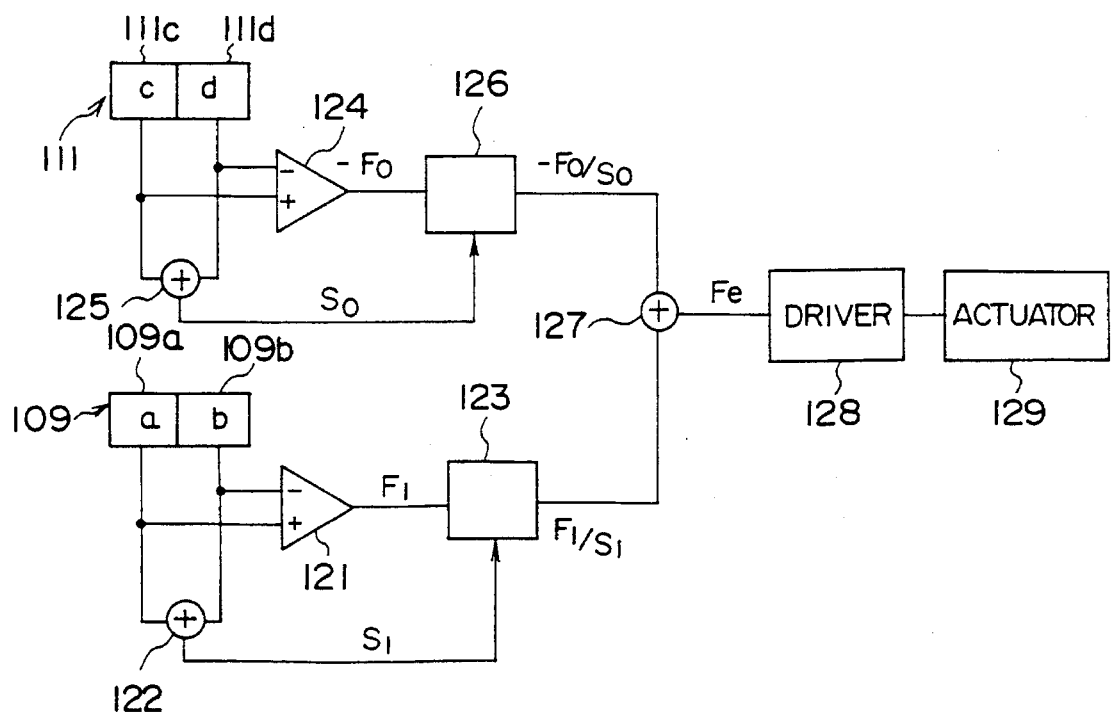
FIG. 17B is a block diagram illustrating a focus control system applicable to the optical pick-up unit shown in FIG. 17A.

Referring to FIG. 17B, the two-divided photo-detector 109 in the measuring system has a first detecting area 109a and a second detecting area 109b. The detecting signals output from the first and second detecting areas 109a and 109b are supplied to a differential amplifier 121. The differential amplifier 121 outputs the differential signal F1 based on the difference between the detecting signals. The detecting signals output from the first and second detecting areas 109a and 109b are also supplied to an adder 122. The adder 122 adds the detecting signals and outputs the summing signal So. A normalizing circuit 123 normalizes the differential signal F1 from the differential amplifier 121 by using the summing signal S1 from the adder 122 and outputs a normalized signal (Fo/S1).

In addition, the two-divided photo-detector 111 in the monitoring system has a first detecting area 111c and a second detecting area 111d. A differential amplifier 124 generates the differential signal −Fo corresponding to the difference between the detecting signals from the first and second detecting areas 111c and 111d of the two-divided photo-detector 111. An adder 122 generates the summing signal So corresponding to the sum of the detecting signals. A normalizing circuit 126 normalizes the differential signal −Fo by using the summing signal So and outputs an normalized signal (−Fo/So).

An adder 127 adds the normalized signal (F1/S1) from the normalizing circuit 123 and the normalized signal (Fo/So) from the normalizing circuit 126 to each other. The adder 127 then outputs the focus error signal Fe calculated in accordance with the above formula (38). A driver 128 drives an actuator 129 based on the focus error signal Fe supplied from the adder 127. The actuator 129 moves the objective lens 104 in an optical axis in accordance with a driving signal supplied from the driver 128.

In the above focus control system, the objective lens 104 is always moved so that the focus error signal Fe becomes the zero level. That is, the objective lens 104 is moved so that the light beam is always focused on the surface of the optical disk 105 by the objective lens 104.

Figure 20:
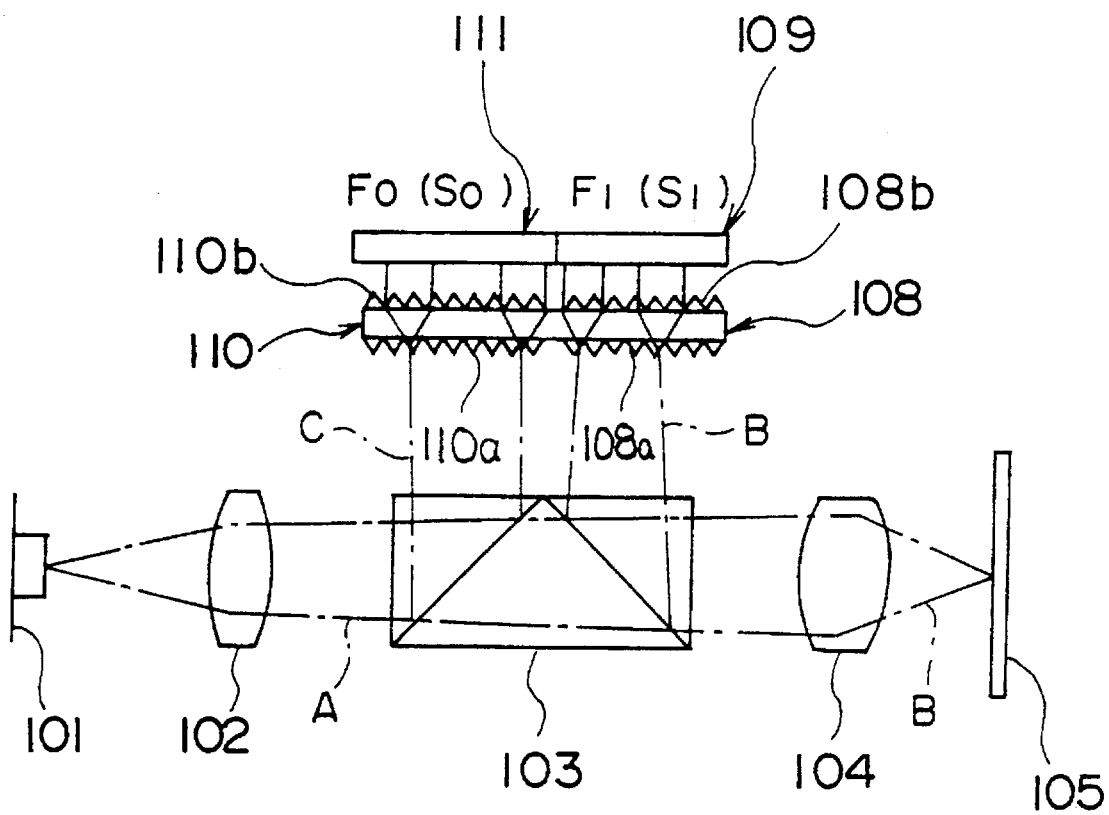
FIG. 20 is a diagram illustrating another configuration of the optical pick-up unit.

A description will now be given, with reference to FIG. 20, an infinitesimal displacement measuring apparatus (an optical pick-up unit) according to a fifth embodiment. In FIG. 20, those parts which are the same as those shown in FIG. 17A are given the same reference numbers.

Referring to FIG. 20, the beam splitter 103 is formed of three triangular prisms so that a part of the light beam A supplied from the semiconductor laser unit 101 via the collimate lens 102 is reflected as the bundle C of rays in the same direction as the bundle B of rays returned from the surface of the optical disk 105 via the objective lens 104. That is, the beam splitter 103 divides the light beam into the bundle B of rays used for the measuring and the bundle C of rays used for the monitoring in the same direction.

In the above embodiment, since the bundle B of rays used for the measuring and the bundle C of rays used for monitoring travel in the same direction, the first and second gratings 108a and 108b of the double grating unit 108 and the first and second gratings 110a and 110b of the double grating unit 110 can be formed on a single element such as a transparent substrate. In addition, the surface of the two-divided photo-detector 111 used for the monitoring and the surface of the two-divided photo-detector 109 for the measuring can be formed on the same substrate. Thus, the numbers of grating unit and photo-detector can be reduced, so that parts of the optical system can be greatly reduced. As a result, the optical pick-up unit can be further miniaturized and lightened.

Figure 21A:
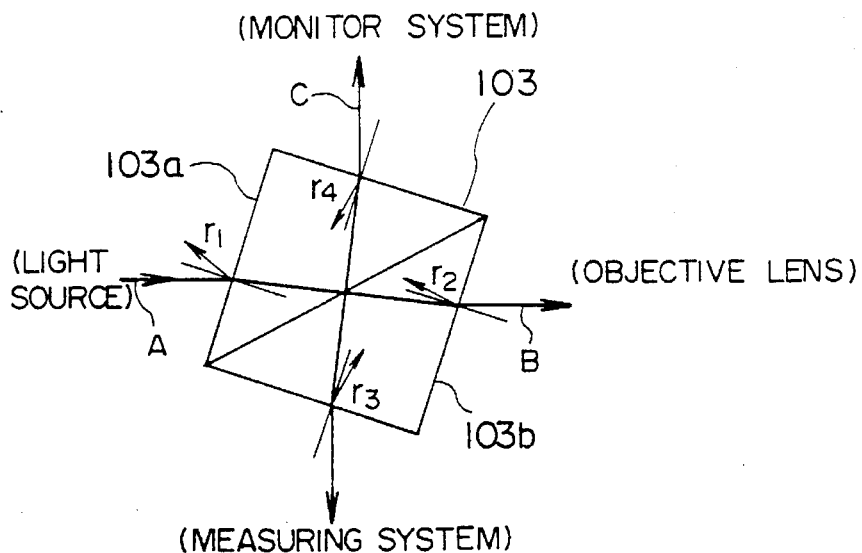
FIGS. 21A, 21B and 21C are diagrams illustrating modifications of the beam splitter.
Figure 21B:
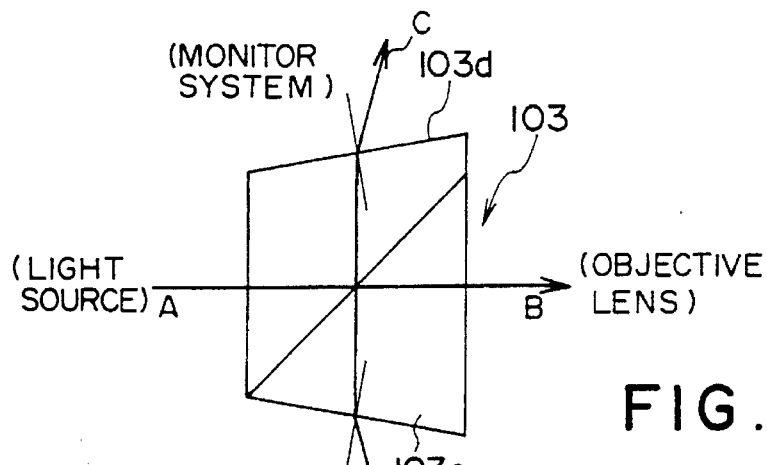
Figure 21C:
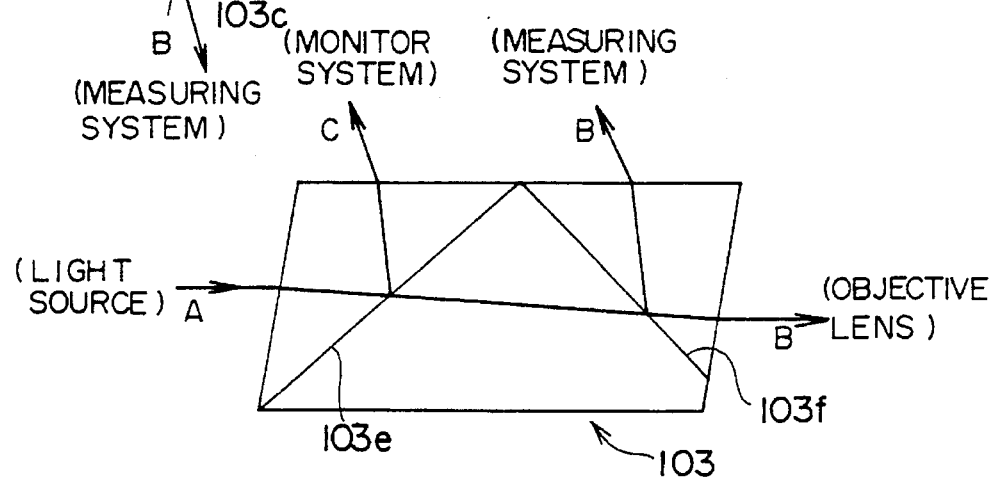

FIGS. 21A, 21B and 21C show modifications of the beam splitter 103.

In a modification shown in FIG. 21A, the beam splitter 103 is formed of two prisms. A surface 103a on which the light beam A from the light source (the semiconductor laser unit 101) is incident and a surface 103b through which the bundle B of rays travels to the objective lens 104 are inclined with respect to the optical axis. In FIG. 21A, $r_1$, $r_2$, $r_3$ and $r_4$ respectively represent reflected light on surfaces of the beam splitter 103.

In a modification shown in FIG. 21B, the beam splitter 103 is formed of two prisms. A surface 103c through which the bundle B of rays travels to the measuring system (including the double grating unit 108 and the two-divided photo-detector 109) and a surface 103d through which the bundle C of rays travels to the monitoring system (including the double grating unit 110 and the two-divided photo-detector 111) are inclined with respect to the optical axis.

In a modification shown in FIG. 21C, the beam splitter 103 is formed of three prisms. Surfaces 103e and 103f through which the light beam A (the bundle B of rays) travels to the objective lens 104 are inclined with respect to the optical axis.

Since the surfaces of the beam splitter 103 through which the light beam (the bundle of rays) passes are inclined with respect to the optical axis in the above modifications, the interference between reflected light generated in the beam splitter 103 and the bundle C of rays used for the monitoring and/or the bundle B of rays used for the measuring can be reduced. As a result, the accuracy of the focus error signal Fe can be improved.

Figure 22:
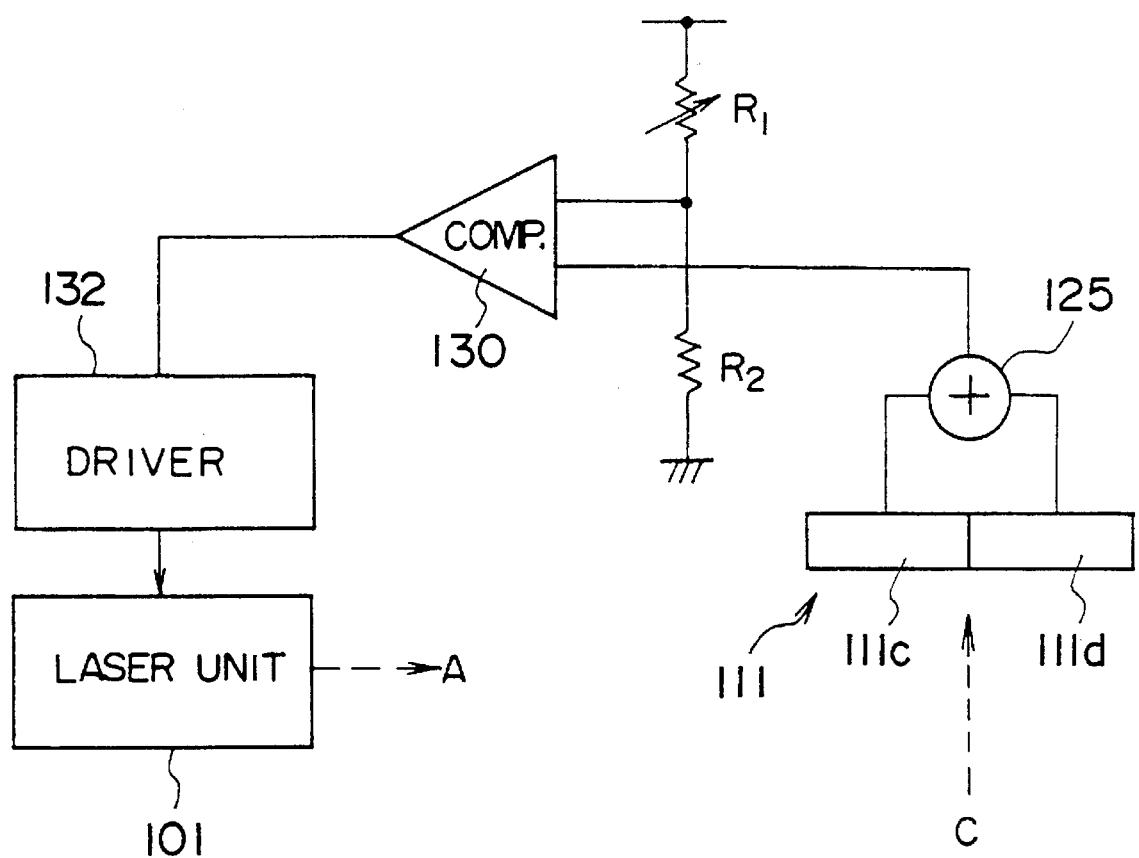
FIG. 22 is a circuit block diagram illustrating a system for controlling the output of the semiconductor laser unit (the light source).

FIG. 22 shows a circuit for controlling a laser diode included in the semiconductor laser unit 101 so that the intensity of the light beam emitted from the laser diode is maintained at constant level. This circuit is added to the focus control system shown in FIG. 17B.

Referring to FIG. 22, the summing signal output from the adder 125 is supplied to a comparator 130. The level of the summing signal corresponds to a total amount of the bundle C of rays projected onto the detecting areas 111c and 111d of the two-divided photo-detector 111. The comparator 130 receives a reference voltage generated by dividing resistors R1 and R2 and compares the level of the summing signal and the reference voltage. The reference voltage corresponds to an amount of light which should be received by the two-divided photo-detector 111. The comparator 130 outputs a control signal corresponding to the comparison result. A driver 132 drives the laser diode in the semiconductor laser unit 101 based on the control signal supplied from the comparator 130 so that the total amount of the bundle C of rays projected on the two-divided photo-detector 111 is maintained at a constant value corresponding to the reference voltage. As a result, the power of the light beam A emitted from the semiconductor laser unit 101 is controlled so as to be maintained at a constant level. Thus, the reliability of the focus control system can be further improved.

According to the above circuit, the two-divided photo-detector 111 is used for two purposes, that is, to correct the focus error signal Fe and to control the output of the semiconductor laser unit 101. Thus, a new optical sensor used to control the output of the semiconductor laser unit 101 is not needed. In addition, since the output of the laser unit 101 is controlled based on the bundle C of rays detected by the two-divided photo-detector 111, the control signal used to control the output of the laser unit 101 is not affected by light returned from the optical disk 105. Thus, the output control of the laser unit 101 can be further accurately carried out.

The present invention is not limited to the aforementioned embodiments, and variations and modifications may be made without departing from the scope of the claimed invention.

What is claimed is:

1. An infinitesimal displacement measuring apparatus comprising:

a light source for emitting a light beam;

an optical system through which the light beam emitted from said light source travels to an article;

a double grating unit on which the light beam reflected by said article is incident, said double grating unit having a first grating and a second grating, said first grating receiving the light beam and generating ±n-th order diffraction light beams (n is an integer), said second grating receiving the ±n-th order diffraction light beams from said first grating and generating ±m-th order diffraction light beams (m is an integer);

detecting means for detecting an interference pattern formed by said ±m-th order diffraction light beams from said second grating of said double grating unit; and operation means for carrying out an operation for obtaining a displacement of said article in a direction parallel to an optical axis of said optical system based on the interference pattern detected by said detecting means.

2. The apparatus as claimed in claim 1, wherein a first grating period of said first grating differs from a second grating period of said second grating.

3. The apparatus as claimed in claim 1, wherein a first grating period of said first grating is equal to a second grating period of said second grating.

4. The apparatus as claimed in claim 3, wherein a phase of said first grating differs from a phase of second grating.

5. The apparatus as claimed in claim 4, wherein a difference between phases of said first grating and said second grating is 90°.

6. The apparatus as claimed in claim 1 wherein said detecting means has a sensor unit for optically detecting the interference pattern and outputting a detecting signal corresponding to a detected interference pattern, and wherein said operation means has a operation circuit for generating a signal corresponding to the displacement of said article based on the detecting signal supplied from said sensor unit.

7. The apparatus as claimed in claim 6, wherein said sensor unit has a photo-detector having at least two divided detecting areas on which the interference pattern is formed, said divided detecting areas outputting detecting signals corresponding to amounts of light projected thereon, and wherein said operation circuit generates the signal corresponding to the displacement of said article based on a difference between the detecting signals from said divided detecting areas of said photo-detector.

8. The apparatus as claimed in claim 1, wherein the interference pattern is generated by ±1st order diffraction light beams which are generated by the second grating based on ±1st order diffraction light beams supplied from said first grating.

9. The apparatus as claimed in claim 1 further comprising:

separation means for separating monitoring light from the light beam in said optical system before the light beam reaches said article;

a monitoring double grating unit on which the monitoring light is incident, said monitoring double grating unit having a first grating and a second grating, said first grating receiving the monitoring light and generating ±n-th order diffraction light beams, said second grating receiving the ±n-th order diffraction light beams and generating ±m-th order diffraction beams;

monitor detection mean for detecting a monitor interference pattern generated by the ±m-th order diffraction beams from said second grating of said monitoring double grating unit; and correction means for correcting the displacement obtained by said operation means based on the monitor interference pattern detected by said monitor detection means.

10. The apparatus as claimed in claim 9, wherein said correction means has:

first means for generating a monitoring signal based on the monitor interference pattern detected by said monitor detection means; and second means for correcting the displacement obtained by said operation means based on the monitoring signal supplied from said first means.

11. The apparatus as claimed in claim 10, wherein said monitor detection means has a photo-detector having at least two divided detecting areas on which the monitor interference pattern is formed, said divided detecting areas outputting detecting signals corresponding to amounts of light projected thereon, and wherein said first means of said correction means has means for generating the monitoring signal based on a difference between the detecting signals from said divided detecting areas of said photo-detector.

12. The apparatus as claimed in claim 9, wherein said separation means has an optical element for making the light beam reflected by said article and the monitoring light travel in the same direction, said double grating unit and said monitoring double grating unit being arranged so as to respectively receive the light beam and the monitoring light.

13. The apparatus as claimed in claim 9, wherein said separation means has an optical element having a surface which is inclined with respect to the optical axis, the light beam traveling from said light source to said article through the surface.

14. The apparatus as claimed in claim 9, wherein said separation means has an optical element having a surface which is inclined with respect to the optical axis, the monitor light passing through the surface.

15. The apparatus as claimed in claim 9, wherein said separation means has an optical element having a surface which is inclined with respect to the optical axis, the light beam reflected by said article passing through the surface.

16. The apparatus as claimed in claim 9 further comprising:

control means for controlling intensity of the light beam emitted from said light source based on the monitoring light separated from the light beam by said separation means.

17. The apparatus as claimed in claim 11 further comprising:

control means for controlling intensity of the light beam emitted from said light source based on the signals output from the divided detecting areas of said photo-detector.

18. The apparatus as claimed in claim 17, wherein said control means has:

adding means for adding the detecting signals output from the divided detecting areas of said photo-detector, said control means controlling the intensity of the light beam emitted from the light source based on a result obtained by said adding means.

19. An optical pick-up unit for irradiating a light beam onto a surface of a recording medium in order to optically record information in the recording medium and/or in order to optically reproduce information from the recording medium, said optical pick-up unit comprising:

a light source for emitting a light beam:

an optical system through which the light beam emitted from said light source travels to the recording medium, said optical system having at least an optical element for focusing the light beam on the surface of said recording medium;

a double grating unit on which the light beam reflected by said recording medium is incident, said double grating unit having a first grating and a second grating, said first grating receiving the light beam and generating ±n-th order diffraction light beams (n is an integer), said second grating receiving the ±n-th order diffraction light beams from said first grating and generating ±m-th order diffraction light beams (m is an integer ); and detecting means for detecting an interference pattern formed by said ±m-th order diffraction light beams from said second grating of said double grating unit and for outputting a detecting signal corresponding to the interference pattern.

20. The unit as claimed in claim 19, wherein a first grating period of said first grating differs from a second grating period of said second grating.

21. The unit as claimed in claim 19, wherein a first grating period of said first grating is equal to a second grating period of said second grating.

22. The unit as claimed in claim 21, wherein a phase of said first grating differs from a phase of said second grating.

23. The unit as claimed in claim 22, wherein a difference between phases of said first grating and said second grating is 90°.

24. The unit as claimed in claim 19, wherein said detecting means has a photo-detector having a plurality of divided detecting areas on which the interference pattern is formed, said divided detecting areas outputting detecting signals.

25. The unit as claimed in claim 19, wherein the interference pattern is generated by ±1st order diffraction light beams which are generated by the second grating based on ±1st order diffraction light beams supplied from said first grating.

26. The unit as claimed in claim 19 further comprising:

separation means for separating monitoring light from the light beam in said optical system before the light beam reaches said recording medium;

a monitoring double grating unit on which the monitoring light is incident, said monitoring double grating unit having a first grating and a second grating, said first grating receiving the monitoring light and generating ±n-th order diffraction light beams, said second grating receiving the ±n-th order diffraction light beams and generating ±m-th order diffraction beams; and monitor detection mean for detecting a monitor interference pattern generated by the ±m-th order diffraction beams from said second grating of said monitoring double grating unit and for outputting a monitor detecting signal.

27. The unit as claimed in claim 26, wherein said monitor detection means has a photo-detector having a plurality of divided detecting areas on which the monitor interference pattern is formed, said divided detecting areas outputting detecting signals corresponding to amounts of light projected thereon.

28. The unit as claimed in claim 26, wherein said separation means has an optical element for making the light beam reflected by the surface of said recording medium and the monitoring light travel in the same direction, said double grating unit and said monitoring double grating unit being arranged so as to respectively receive the light beam and the monitoring light.

29. The unit as claimed in claim 26, wherein said separation means has an optical element having a surface which is inclined with respect to the optical axis, the light beam traveling from said light source to said recording medium through the surface.

30. The unit as claimed in claim 26, wherein said separation means has an optical element having a surface which is inclined with respect to the optical axis, the monitor light passing through the surface.

31. The unit as claimed in claim 26, wherein said separation means has an optical element having a surface which is inclined with respect to the optical axis, the light beam reflected by the surface of said recording medium passing through the surface.

32. The unit as claimed in claim 26 further comprising:

control means for controlling intensity of the light beam emitted from said light source based on the monitor detecting signal detected by said monitor detecting means.

33. The unit as claimed in claim 27 further comprising:

control means for controlling intensity of the light beam emitted from said light source based on a total sum of the signals output from the divided detecting areas of said photo-detector.

34. The unit as claimed in claim 19 further comprising:

first means for generating a focus error signal based on the detecting signal output from said detecting means, the focus error signal representing a degree of defocusing of the light beam on the surface of said recording medium.

35. The unit as claimed in claim 34 further comprising:

second means for generating a tracking error signal based on the detecting signal output from said detecting means, the tracking error signal representing a distance between a spot of the light beam on said recording medium and a track on which information is recorded.

36. The unit as claimed in claim 35 further comprising:

a third means for generating a read/write signal based on the detecting signal output from said detecting means, the read/write signal representing information which is recorded in the recording medium.

\* \* \* \* \*